US012715437B2

(12) United States Patent
Baba et al.

(10) Patent No.: US 12,715,437 B2
(45) Date of Patent: Aug. 25, 2026

(54) PROCESSING METHOD, PROCESSING SYSTEM, AND STORAGE MEDIUM

(71) Applicant: DENSO CORPORATION, Kariya-city (JP)

(72) Inventors: Atsushi Baba, Kariya-city (JP); Yuki Mae, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 360 days.

(21) Appl. No.: 18/454,726

(22) Filed: Aug. 23, 2023

(65) Prior Publication Data

US 2023/0391333 A1 Dec. 7, 2023

Related U.S. Application Data

(63) Continuation of application No. PCT/JP2022/004915, filed on Feb. 8, 2022.

(30) Foreign Application Priority Data

Feb. 25, 2021 (JP) ................................ 2021-028872

(51) Int. Cl.
*B60W 30/16* (2020.01)

(52) U.S. Cl.
CPC ......... *B60W 30/16* (2013.01); *B60W 2520/10* (2013.01); *B60W 2520/105* (2013.01);
(Continued)

(58) Field of Classification Search
CPC ....... B60W 2520/10; B60W 2520/105; B60W 2554/4041; B60W 2554/4042;
(Continued)

(56) References Cited

U.S. PATENT DOCUMENTS

| | | | | |
|---|---|---|---|---|
| 9,272,711 | B1 * | 3/2016 | Sivaraman | G08G 1/161 |
| 10,328,938 | B2 * | 6/2019 | Schubert | B60W 30/17 |

(Continued)

FOREIGN PATENT DOCUMENTS

| | | |
|---|---|---|
| CN | 109774708 A | 5/2019 |
| CN | 111278704 A | 6/2020 |

(Continued)

*Primary Examiner* — Babar Sarwar

(74) *Attorney, Agent, or Firm* — Precision Patents, P.C.

(57) ABSTRACT

A processing method, which is executed by a processor for performing processing related to driving control of a host vehicle, includes: acquiring detection information indicating a state detected in a traveling environment of the host vehicle; setting a safety envelope, wherein the setting of the safety envelope includes defining a boundary, a margin, or a buffer area around the host vehicle; and monitoring a violation of the safety envelope based on a comparison of the safety envelope and a positional relationship between the host vehicle and a target vehicle. When the target vehicle is a front vehicle and the host vehicle is a rear vehicle, the safety envelope is calculated based on a velocity and a maximum deceleration of the front vehicle, and a velocity, a maximum acceleration, and a minimum deceleration of the rear vehicle. The minimum deceleration of the rear vehicle is set to be equal to or less than the maximum deceleration of the front vehicle.

15 Claims, 28 Drawing Sheets

(52) U.S. Cl.
CPC ............... *B60W 2554/4041* (2020.02); *B60W 2554/4042* (2020.02); *B60W 2554/802* (2020.02); *B60W 2754/30* (2020.02)

(58) Field of Classification Search
CPC ....... B60W 2554/802; B60W 2720/10; B60W 2754/30; B60W 30/09; B60W 30/16; B60W 60/0015; G08G 1/16
See application file for complete search history.

(56) References Cited

U.S. PATENT DOCUMENTS

| | | | | |
|---|---|---|---|---|
| 11,623,622 | B2* | 4/2023 | Buerkle | B60T 7/22 701/70 |
| 2005/0159875 | A1* | 7/2005 | Chia | B60K 31/0008 701/96 |
| 2010/0020170 | A1* | 1/2010 | Higgins-Luthman | G06V 20/56 348/135 |
| 2013/0144465 | A1* | 6/2013 | Shida | B60T 7/22 701/1 |
| 2013/0317719 | A1* | 11/2013 | Ham | B60K 31/00 701/96 |
| 2015/0151725 | A1* | 6/2015 | Clarke | B60W 30/18163 701/28 |
| 2017/0072921 | A1* | 3/2017 | Amato | B60T 7/22 |
| 2017/0101096 | A1* | 4/2017 | Kim | B60W 30/16 |
| 2017/0361796 | A1* | 12/2017 | Kim | B60K 31/0008 |
| 2018/0188746 | A1* | 7/2018 | Lesher | G05D 1/0217 |
| 2019/0106108 | A1* | 4/2019 | Wienecke | B60W 30/162 |
| 2019/0291726 | A1* | 9/2019 | Shalev-Shwartz | B60W 30/09 |
| 2020/0023845 | A1* | 1/2020 | Wang | B60W 30/14 |
| 2020/0218272 | A1* | 7/2020 | Ellis | G05D 1/0088 |
| 2021/0094575 | A1* | 4/2021 | Sato | B60W 30/16 |
| 2023/0043905 | A1* | 2/2023 | Zhu | B60W 50/0205 |

FOREIGN PATENT DOCUMENTS

| | | | | |
|---|---|---|---|---|
| CN | 113002534 | A * | 6/2021 | B60W 10/20 |
| DE | 112018006539 | T5 * | 8/2020 | G08G 1/22 |
| DE | 102020127043 | A1 * | 7/2021 | B60W 60/0015 |
| EP | 3842307 | A1 * | 6/2021 | B60W 50/0097 |
| EP | 3895948 | A1 * | 10/2021 | B60W 30/09 |
| EP | 3679445 | B1 * | 5/2024 | B60W 30/18163 |
| JP | 6708793 | B2 | 6/2020 | |
| KR | 20190109623 | A * | 9/2019 | B60W 30/16 |
| KR | 20210077869 | A * | 6/2021 | B60W 30/08 |
| KR | 20210130302 | A * | 11/2021 | B60W 30/18163 |
| WO | 2019/180506 | A2 | 9/2019 | |

* cited by examiner

FIG. 1

| Terms | Description |
| --- | --- |
| Levels of driving automation | Levels of driving automation may be defined as "mutually exclusive set of driving automation levels, ranging from Level 0 (no automation) to Level 5 (full automation), defining the roles of the driver or user and automation system in relation to each other". |
| Operational design domain (ODD) | Operational design domain may be defined as "specific conditions under which a given driving automation system is designed to function". Operational design domain may be defined as "operating conditions under which a given automated driving system or feature thereof is specifically designed to function, including, but not limited to, environmental, geographical, and time-of-day restrictions, and/or the requisite presence or absence of certain traffic or roadway characteristics". |
| Dynamic driving task (DDT) | Dynamic driving task may be defined as "real-time operational and tactical functions required to operate a vehicle in traffic". Dynamic driving task may be defined as "all of the real-time operational and tactical functions required to operate a vehicle in on-road traffic". |
| Takeover | Takeover may be define as "transfer of the driving task between the automated driving system and the driver". |
| Lagging measure | Lagging measure may be defined as "metrics that are assessed after deployment of an automated driving system and provides confirmation that the positive risk balance as well as conformance with the safety-by-design techniques have been achieved". |
| Leading measure | Leading measure may be defined as "metrics that are derived from data that is assessed prior to deployment of an automated driving system indicating that the automated driving system conforms with safety-by-design techniques to achieve a positive risk balance and avoidance of unreasonable risk". |
| High definition map (HD map) | High definition map may be defined as "maps with high level precision mostly used in the context of automated driving system to give the vehicle precise information about the road environment". |

FIG. 2

| Terms | Description |
|---|---|
| Path planning | Path planning may be defined as "identification and selection of the vehicle trajectory for every defined time-step in response to the situational awareness, destination and other constraints". |
| Operational design domain (ODD) | Operational design domain may be defined as "specific conditions under which a given driving automation system is designed to function".<br>Operational design domain may be defined as "operating conditions under which a given automated driving system or feature thereof is specifically designed to function, including, but not limited to, environmental, geographical, and time-of-day restrictions, and/or the requisite presence or absence of certain traffic or roadway characteristics". |
| Scenario | Scenario may be defined as "description of the temporal relationship between several scenes, with goals and values within a specified situation in a sequence of scenes influenced by actions and events".<br>Scenario may be defined as "description of the consecutive time series of activities integrating the subject vehicle, all its external environment and their interactions in the process of performing a certain driving task".<br>Scenario may be defined as "high level descriptions of common driving situations in which reasonable and foreseeable assumptions about the behavior of other road users shall be made". |
| Scene | Scene may be defined as "snapshot of the environment including the scenery, dynamic elements, and all actors and observers self-representations, and the relationships among those entities".<br>Scene may be defined as "snapshot of the scenario at a given point of time". |
| Use case | Use case may be defined as "description of a suite of related scenarios". |
| Simulation | Simulation may be defined as "approximated imitation of selected behavioral characteristics of one physical or abstract system by a static or dynamic model". |

FIG. 3

| Terms | Description |
| --- | --- |
| Driving policy (DP) | Driving policy may be defined as "strategy and rules defining acceptable control actions at vehicle level".<br>Driving policy may be decision-making level implementation of the vehicle level safety strategy (VLSS).<br>Driving policy may be a mapping from a sensing state (a description of the world around us) into a driving command (e.g., the command is lateral and longitudinal accelerations for the coming second, which determines where and at what speed should the car be in one second from now). |
| Vehicle level safety strategy (VLSS) | VLSS may represent the set of requirements for the function under development used to support SOTIF related design, verification and validation activities.<br>VLSS may be the overarching specification that ensure the overall AV safety. |
| Safety of the Intended functionality (SOTIF) | SOTIF may be defined as "absence of unreasonable risk due to these potentially hazardous behaviors related to such limitations".<br>SOTIF may be defined as "absence of unreasonable risk due to hazards resulting from functional insufficiencies of the intended functionality or its implementation".<br>SOTIF may be defined as "absence of unreasonable risk due to hazards resulting from functional insufficiencies of the intended functionality or by reasonably foreseeable misuse by road users". |
| Proper response | Proper response may be defined as "the set of corrective actions that the driving policy might require to maintain the SOTIF of an autonomous vehicle (AV) during nominal conditions". |
| Unreasonable risk | Unreasonable risk may be defined as "risk judged to be unacceptable in a certain context according to valid societal moral concepts". |
| Unreasonable situation | Unreasonable situation may be defined as "a situation where some other agent is not behaving reasonably per the assumptions used in the model". |
| Misuse | Misuse may be defined as "usage of the system by a human in a way not intended by the manufacturer or the service provider". |

FIG. 4

| Terms | Description |
| --- | --- |
| Safety envelope | The definition of a "safety envelope" may be a common concept that can be used to address all the principles that the driving policy might comply with. According to this concept, the autonomous vehicle might have one or more boundaries around the ego-vehicle, where the violation of one or more of these boundaries result in different responses by the autonomous vehicle.<br>Safety envelopes may define a physics based margin around the automated vehicle typically combined with defined assumptions about the reasonably foreseeable worst case behavior of others to provide a foundational building block of a safety-related model.<br>Safety envelope may be the basic construct for understanding if the autonomous vehicle is in a high risk scenario.<br>Safety envelope may be defined to demarcate boundaries, margins or buffer areas not only around the ego-vehicle but also around other vehicles, around pedestrians or around stationary objects. |
| DDT fallback | DDT fallback may be defined as "response by the driver or automation system to either perform the DDT or transition to a minimal risk condition after the occurrence of a failure(s) or detection of a functional insufficiency or upon detection of a potentially hazardous behavior".<br>DDT fallback may be defined as "takeover/fallback condition and schemes of transition control from autonomous to control by driver or other system with their relevant use cases". |
| Minimal risk condition (MRC) | Minimal risk condition may be defined as "vehicle state in order to reduce the risk of a harm, when a given trip cannot be completed".<br>Minimal risk condition may be defined as "condition to which a user or an automated driving system may bring a vehicle after performing the minimal risk maneuver in order to reduce the risk of a crash when a given trip cannot be completed". |
| Minimal risk maneuver (MRM) | Minimal risk maneuver may be defined as "automated driving system' s capability of transitioning the vehicle between nominal and minimal risk conditions". |
| Degradation | Degradation may be defined as "state or transition to a state of the item or element with reduced functionality, performance, or both". |

FIG. 5

| Terms | Description |
| --- | --- |
| User | User may be defined as "general term referencing the human role in driving automation". |
| Fallback ready user | Fallback ready user may be defined as "user who is able to operate the vehicle and is capable of intervening to perform the DDT fallback as required and within a time span appropriate for the defined non-driving occupation". |
| Road user | Road user may be defined as "anyone who uses a road including sidewalk and other adjacent spaces".<br>Road users may include pedestrians, cyclists, other VRUs, and vehicles (for example, human driven motor vehicles or ADS-equipped vehicles). |
| Vulnerable road user (VRU) | Vulnerable road user may be defined as "non-protected road user such as motorcyclists, cyclists, pedestrians and persons with disabilities or reduced mobility and orientation". |
| Non vulnerable road user | Non vulnerable road user may be defined as "protected road users such as users in other vehicles, trucks, construction and agricultural machines". |
| Other road user | Other road user may be defined as "vulnerable and non-vulnerable road users with no role in the ego automated vehicle". |
| Response time | Response time may be defined as "the time it takes for a road user to initiate an appropriate response (e.g., braking/steering/accelerating/stopping) due to a specific stimulus in a given scenario" |

FIG. 12A

EXPRESSION 1 $$d_{brake,front} = \frac{v_f^2}{2a_{max,brake}}$$

FIG. 12B

EXPRESSION 2 $$d_{reaction,rear} = v_r\rho + \frac{1}{2}a_{max,accel}\rho^2$$

FIG. 12C

EXPRESSION 3 $$d_{brake,rear} = \frac{(v_r + a_{max,accel}\rho)^2}{2a_{min,brake}}$$

FIG. 12D

EXPRESSION 4 $$d_{min} = d_{reaction,rear} + d_{brake,rear} - d_{brake,front}$$

FIG. 16

| | BETWEEN $c_m$ AND $c_r$ | BETWEEN $c_f$ AND $c_m$ | BETWEEN $c_f$ AND $c_r$ |
|---|---|---|---|
| PRECEDING VEHICLE BRAKING DISTANCE | $\frac{v_m^2}{2a_{max,brake}}$ | $\frac{v_f^2}{2a_{max,brake}}$ | $\frac{v_f^2}{2a_{max,brake}}$ |
| FOLLOWING VEHICLE FREE TRAVELING DISTANCE | $v_r\rho + \frac{1}{2}a_{max,accel}\rho^2$ | $v_m\rho + \frac{1}{2}a_{max,accel}\rho^2$ | $v_r\rho + \frac{1}{2}a_{max,accel}\rho^2$ |
| FOLLOWING VEHICLE BRAKING DISTANCE | $\frac{(v_r + a_{max,accel}\rho)^2}{2a_{min,brake}}$ | $\frac{(v_m + a_{max,accel}\rho)^2}{2a_{min,brake}}$ | $\frac{(v_r + a_{max,accel}\rho)^2}{2a_{min,brake}}$ |
| SAFETY DISTANCE | $d_{min,mr}$ | $d_{min,fm}$ | $d_{min,fr}$ |

FIG. 17

(EXPRESSION 8)

$$\frac{v_m^2}{2a_{max,brake}} - v_m\rho - \frac{1}{2}a_{max,accel}\rho^2 - \frac{\left(v_m + a_{max,accel}\rho\right)^2}{2a_{min,brake}} - L \leq 0$$

FIG. 18

(EXPRESSION 9)

$$\frac{a_{min,brake} - a_{max,brake}}{2a_{min,brake}a_{max,brake}} v_m^2 - \left(1 + \frac{a_{max,accel}}{a_{min,brake}}\right)\rho v_m - \frac{1}{2}\left(1 + \frac{a_{max,accel}}{a_{min,brake}}\right)a_{max,accel}\rho^2 - L \leq 0$$

FIG. 19A (EXPRESSION 10)

$$a_{min,brake} > a_{max,brake}$$

FIG. 19B (EXPRESSION 11)

$$v_{limit} = \frac{b_f(a_r + b_r)\rho + \sqrt{b_r b_f\left\{2L\left(b_r - b_f\right) + \left(a_r + b_f\right)(a_r + b_r)\rho^2\right\}}}{b_r - b_f}$$

Where, $b_f = a_{max,brake}$, $a_r = a_{max,accel}$, $b_r = a_{min,brake}$

FIG. 21

| | BETWEEN $c_m$ AND $c_r$ | BETWEEN $c_f$ AND $c_m$ | BETWEEN $c_f$ AND $c_r$ |
|---|---|---|---|
| PRECEDING VEHICLE STOP DISTANCE | $P_m$ | $P_f$ | $P_f$ |
| FOLLOWING VEHICLE STOP DISTANCE | $S_r$ | $S_m$ | $S_r$ |
| SAFETY DISTANCE | $d_{min,mr} = S_r - P_m$ | $d_{min,fm} = S_m - P_f$ | $d_{min,fr} = S_r - P_f$ |

$P$ : STOP DISTANCE WITHOUT RESPONSE TIME
$S$ : STOP DISTANCE WITH RESPONSE TIME

FIG. 23

| | BETWEEN $c_m$ AND $c_r$ | BETWEEN $c_f$ AND $c_m$ | BETWEEN $c_f$ AND $c_r$ |
|---|---|---|---|
| POSITIVE-SIDE VEHICLE STOP DISTANCE | $P_m$ | $S_f$ | $S_f$ |
| NEGATIVE-SIDE VEHICLE STOP DISTANCE | $S_r$ | $S_m$ | $S_r$ |
| SAFETY DISTANCE | $d_{min,mr} = S_r - P_m$ | $d_{min,fm} = S_m + S_f$ | $d_{min,fr} = S_r + S_f$ |

FIG. 25

| | BETWEEN $c_m$ AND $c_r$ | BETWEEN $c_f$ AND $c_m$ | BETWEEN $c_f$ AND $c_r$ |
|---|---|---|---|
| LEFT-SIDE VEHICLE STOP DISTANCE | $Q_r$ | $Q_m$ | $Q_r$ |
| RIGHT-SIDE VEHICLE STOP DISTANCE | $Q_m$ | $Q_f$ | $Q_f$ |
| SAFETY DISTANCE | $d_{min,mr} = Q_r - Q_m$ | $d_{min,fm} = Q_m - Q_f$ | $d_{min,fr} = Q_r - Q_f$ |

FIG. 26

(EXPRESSION 16)

$$\begin{aligned} d_{\min} &= \max\left(S_r - P_m, (S_r - P_f) - (S_m - P_f) - L\right) \\ &= \max\left(S_r - P_m, S_r - S_m - L\right) \\ &= \max\left(d_1, d_2\right) \end{aligned}$$

FIG. 27A (EXPRESSION 17)

$$\begin{aligned} d_1 &= S_r - P_m \\ &= \left[v_r\rho + \frac{1}{2}a_{\max,\text{accel}}\rho^2 + \frac{(v_r + a_{\max,\text{accel}}\rho)^2}{2a_{\min,\text{brake}}}\right] - \frac{v_m^2}{2a_{\max,\text{brake}}} \end{aligned}$$

FIG. 27B (EXPRESSION 18)

$$\begin{aligned} d_2 &= S_r - S_m - L \\ &= \left[v_r\rho + \frac{1}{2}a_{\max,\text{accel}}\rho^2 + \frac{(v_r + a_{\max,\text{accel}}\rho)^2}{2a_{\min,\text{brake}}}\right] - \left[v_m\rho + \frac{1}{2}a_{\max,\text{accel}}\rho^2 + \frac{(v_m + a_{\max,\text{accel}}\rho)^2}{2a_{\min,\text{brake}}}\right] - L \end{aligned}$$

FIG. 28A (EXPRESSION 19) $\mathbb{E}[d_{\min}] + 3\sqrt{\mathbb{V}[d_{\min}]}$

FIG. 28B (EXPRESSION 20) $\mathbb{E}[d_{\min}] \approx \Phi(\alpha)\mathbb{E}[d_1] + \Phi(-\alpha)\mathbb{E}[d_2] + \theta\phi(\alpha)$

FIG. 28C (EXPRESSION 21)

$$\mathbb{V}[d_{\min}] \approx \Phi(\alpha)\left\{(\mathbb{E}[d_1])^2 + \mathbb{V}[d_1]\right\} + \Phi(-\alpha)\left\{(\mathbb{E}[d_2])^2 + \mathbb{V}[d_2]\right\} + \theta\phi(\alpha)(\mathbb{E}[d_1] + \mathbb{E}[d_2]) - \mathbb{E}[d_{\min}]^2$$

FIG. 28D (EXPRESSION 22) $\theta = \sqrt{\mathbb{V}[d_1] + \mathbb{V}[d_2]}, \alpha = \frac{\mathbb{E}[d_1] - \mathbb{E}[d_2]}{\theta}$

FIG. 28E (EXPRESSION 23) $\mathbb{E}[d_1] = \mathbb{E}[S_r] - \mathbb{E}[P_m]$

FIG. 28F (EXPRESSION 24) $\mathbb{V}[d_1] = \mathbb{V}[S_r] + \mathbb{V}[P_m]$

FIG. 28G (EXPRESSION 25) $\mathbb{E}[d_2] = \mathbb{E}[S_r] - \mathbb{E}[S_m] - L$

FIG. 28H (EXPRESSION 26) $\mathbb{V}[d_2] = \mathbb{V}[S_r] + \mathbb{V}[S_m]$

FIG. 28I (EXPRESSION 27) $v \sim \mathcal{N}(\mu, \sigma^2), \mathbb{E}[v] = \mu, \mathbb{V}[v] = \sigma^2$

FIG. 28J (EXPRESSION 28) $\mathbb{E}[S_r] = \mu_r\rho + \frac{1}{2}a_{\text{max,accel}}\rho^2 + \frac{(\mu_r + a_{\text{max,accel}}\rho)^2 + \sigma_r^2}{2a_{\text{min,brake}}}$

FIG. 28K (EXPRESSION 29) $\mathbb{E}[S_m] = \mu_m\rho + \frac{1}{2}a_{\text{max,accel}}\rho^2 + \frac{(\mu_m + a_{\text{max,accel}}\rho)^2 + \sigma_m^2}{2a_{\text{min,brake}}}$

FIG. 28L (EXPRESSION 30) $\mathbb{E}[P_m] = \frac{\mu_m^2 + \sigma_m^2}{2a_{\text{max,brake}}}$

FIG. 28M (EXPRESSION 31)

$$\mathbb{V}[S_r] = \frac{\sigma_r^2}{2a_{\text{min,brake}}^2}\left\{2\mu_r^2 + \sigma_r^2 + 4(a_{\text{max,accel}} + a_{\text{min,brake}})\rho\mu_r + 2(a_{\text{max,accel}} + a_{\text{min,brake}})^2\rho^2\right\}$$

FIG. 28N (EXPRESSION 32)

$$\mathbb{V}[S_m] = \frac{\sigma_m^2}{2a_{\text{min,brake}}^2}\left\{2\mu_m^2 + \sigma_m^2 + 4(a_{\text{max,accel}} + a_{\text{min,brake}})\rho\mu_m + 2(a_{\text{max,accel}} + a_{\text{min,brake}})^2\rho^2\right\}$$

FIG. 28O (EXPRESSION 33) $\mathbb{V}[P_m] = \frac{\sigma_m^2}{2a_{\text{max,brake}}^2}(2\mu_m^2 + \sigma_m^2)$ 1
PROCESSING SYSTEM
6160
CONTROL
6120
PLAN
100
SENSE
140
RISK SUPERVISION
SAFETY EVALUATION
SENSOR SYSTEM
EXTERNAL SENSOR
INTERNAL SENSOR
COMMUNICATION SYSTEM
MAP DB
5
50
52
6
7

FIG. 30

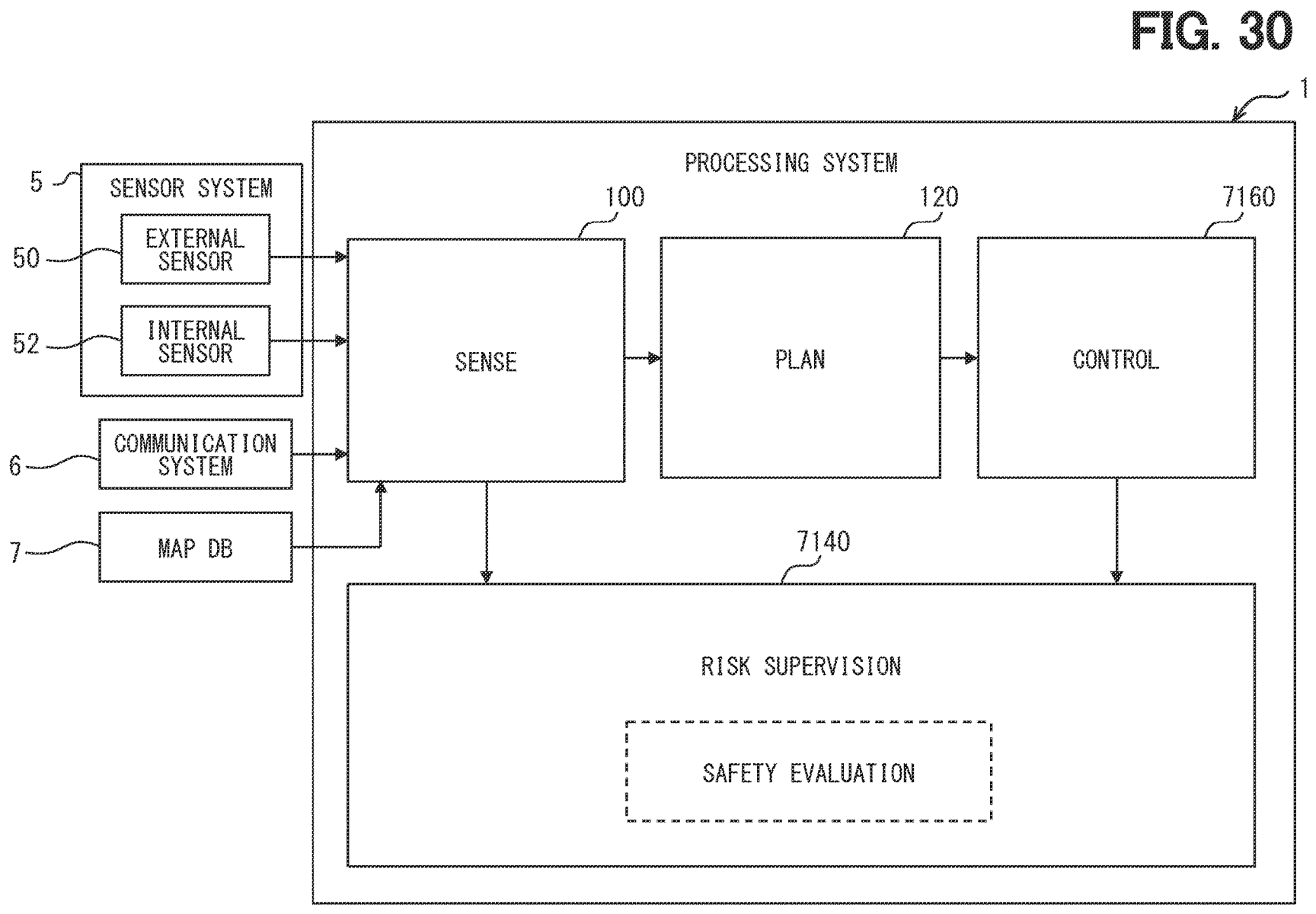

1
PROCESSING SYSTEM
7160
CONTROL
120
PLAN
100
SENSE
7140
RISK SUPERVISION
SAFETY EVALUATION
SENSOR SYSTEM
EXTERNAL SENSOR
INTERNAL SENSOR
COMMUNICATION SYSTEM
MAP DB
5
50
52
6
7

1
PROCESSING SYSTEM
100
SENSE
120
PLAN
160
CONTROL
140
RISK SUPERVISION
SAFETY EVALUATION
8180
TEST
SAFETY EVALUATION
8001
SENSOR SYSTEM
EXTERNAL SENSOR
INTERNAL SENSOR
COMMUNICATION SYSTEM
MAP DB
5
50
52
6
7

PROCESSING METHOD, PROCESSING SYSTEM, AND STORAGE MEDIUM

CROSS REFERENCE TO RELATED APPLICATION

The present application is a continuation application of International Patent Application No. PCT/JP2022/004915 filed on Feb. 8, 2022, which designated the U.S. and claims the benefit of priority from Japanese Patent Application No. 2021-028872 filed on Feb. 25, 2021. The entire disclosures of all of the above applications are incorporated herein by reference.

TECHNICAL FIELD

The present disclosure relates to a processing technique of performing processing related to driving control of a host vehicle.

BACKGROUND

Conventionally, driving control related to a navigation operation of a host vehicle is planned according to detection information related to internal and external environments of the host vehicle. When it is determined that there is potential accident liability based on a safety model in compliance with a driving policy and the detection information, a constraint or restriction is applied to the driving control.

SUMMARY

A processing method, which is executed by a processor for performing processing related to driving control of a host vehicle, includes: acquiring detection information indicating a state detected in a traveling environment of the host vehicle; setting a safety envelope, wherein the setting of the safety envelope includes defining a boundary, a margin, or a buffer area around the host vehicle; and monitoring a violation of the safety envelope based on a comparison of the safety envelope and a positional relationship between the host vehicle and a target vehicle. When the target vehicle is a front vehicle and the host vehicle is a rear vehicle, the safety envelope is calculated based on a velocity and a maximum deceleration of the front vehicle, and a velocity, a maximum acceleration, and a minimum deceleration of the rear vehicle. The minimum deceleration of the rear vehicle is set to be equal to or less than the maximum deceleration of the front vehicle.

BRIEF DESCRIPTION OF DRAWINGS

Objects, features and advantages of the present disclosure will become apparent from the following detailed description made with reference to the accompanying drawings.

FIG. 1 is a description table illustrating descriptions of terms in the present disclosure.

FIG. 2 is a description table illustrating descriptions of terms in the present disclosure.

FIG. 3 is a description table illustrating descriptions of terms in the present disclosure.

FIG. 4 is a description table illustrating definitions of terms in the present disclosure.

FIG. 5 is a description table illustrating definitions of terms in the present disclosure.

FIG. 12A to FIG. 12D are diagrams illustrating calculation expressions such as a safety distance.

FIG. 16 is a diagram illustrating expressions and the like for calculating a safety distance between three vehicles.

FIG. 17 is a diagram illustrating Expression 8.

FIG. 18 is a diagram illustrating Expression 9.

FIG. 19A and FIG. 19B are diagrams illustrating Expressions 10 and 11, respectively.

FIG. 21 is a diagram illustrating calculation expressions such as a safety distance between respective vehicles.

FIG. 23 is a diagram illustrating each safety distance as a stop distance.

FIG. 25 is a diagram illustrating a relationship of the safety distance and the stop distance between respective vehicles in the lateral direction.

FIG. 26 is a diagram illustrating Expression 16.

FIG. 27A and FIG. 27B are diagrams illustrating Expressions 17 and 18, respectively.

FIG. 28A to FIG. 28O are diagrams illustrating Expressions 19 to 33, respectively.

FIG. 30 is a block diagram illustrating a processing system of a seventh embodiment.

DETAILED DESCRIPTION

Figure 6:
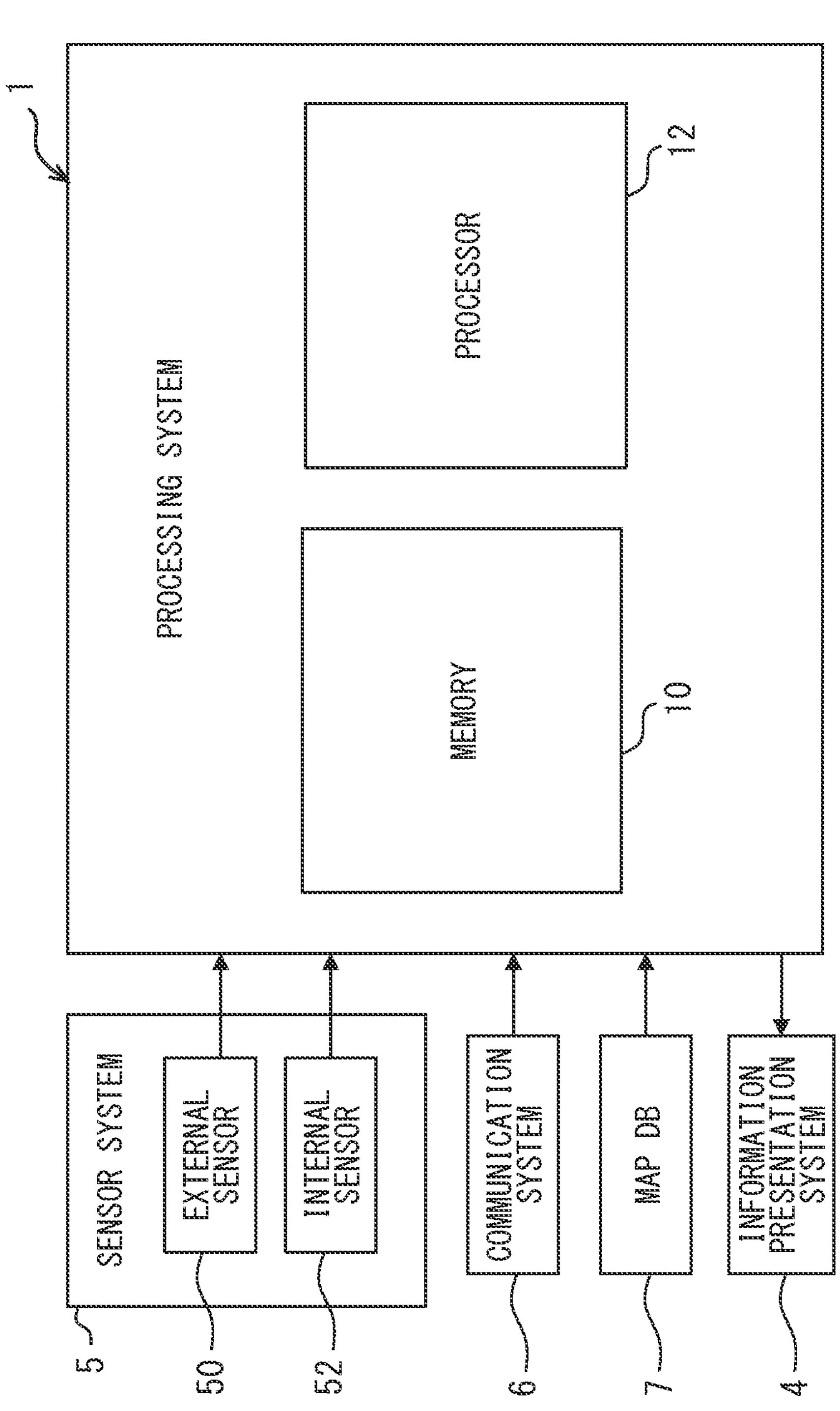
FIG. 6 is a block diagram illustrating a processing system of a first embodiment.

In the present disclosure, according to a first aspect, a processing method, which is executed by a processor for performing processing related to driving control of a host vehicle, includes: acquiring detection information indicating a state detected in a traveling environment of the host vehicle; setting a safety envelope, wherein the setting of the safety envelope includes defining a boundary, a margin, or a buffer area around the host vehicle; and monitoring a violation of the safety envelope based on a comparison of the safety envelope and a positional relationship between the host vehicle and a target vehicle. When the target vehicle is a front vehicle and the host vehicle is a rear vehicle, the safety envelope is calculated based on a velocity and a maximum deceleration of the front vehicle, and a velocity, a maximum acceleration, and a minimum deceleration of the rear vehicle. The minimum deceleration of the rear vehicle is set to be equal to or less than the maximum deceleration of the front vehicle.

According to a second aspect, a processing method, which is executed by a processor for performing processing related to driving control of a host vehicle, includes acquiring detection information indicating a state detected in a traveling environment of the host vehicle; setting a safety envelope, wherein the setting of the safety envelope includes defining a boundary, a margin, or a buffer area around the host vehicle; and monitoring a violation of the safety envelope based on a comparison of the safety envelope and a positional relationship between the host vehicle and a target vehicle and a comparison of a velocity of the host vehicle and one or more limit values set with respect to the velocity of the host vehicle. When the target vehicle is a front vehicle and the host vehicle is a rear vehicle, the safety envelope is calculated based on a velocity and a maximum deceleration of the front vehicle, and a velocity, a maximum acceleration, and a minimum deceleration of the rear vehicle. When the minimum deceleration of the rear vehicle is set to be larger than the maximum deceleration of the front vehicle, the one or more limit values set with respect to the velocity of the host vehicle includes an upper limit velocity calculated by mathematical formula 1 as follows:

(Mathematical formula 1)

$$v_{limit} = \frac{b_f(a_r + b_r)\rho + \sqrt{b_r b_f\{2L(b_r - b_f) + (a_r + b_f)(a_r + b_r)\rho^2\}}}{(b_r - b_f)}$$

where $v_{limit}$ is the upper limit velocity, $b_f$ is the maximum deceleration of the front vehicle, $a_r$ is the maximum acceleration of the rear vehicle, $b_r$ is the minimum deceleration of the rear vehicle, ρ is a response time, and L is a vehicle length of the host vehicle.

According to a third aspect, a processing method, which is executed by a processor for performing processing related to driving control of a host vehicle, includes: acquiring detection information indicating a state detected in a traveling environment of the host vehicle; setting a safety envelope, wherein the setting of the safety envelope includes defining a boundary, a margin, or a buffer area around the host vehicle; and monitoring a violation of the safety envelope based on a comparison of the safety envelope and a positional relationship between the host vehicle and a target vehicle. When the host vehicle is a rear vehicle, a stop distance is defined as S, when the host vehicle is a front vehicle, a stop distance is defined as P, and a total length of the host vehicle is defined as L. The boundary, the margin, or the buffer area is defined to satisfy P–S–L≤0.

According to a fourth aspect, a processing system that performs processing related to driving control of a host vehicle is provided. The processing system includes a processor configured to: acquire detection information indicating a state detected in a traveling environment of the host vehicle; set a safety envelope, wherein the setting of the safety envelope includes defining a boundary, a margin, or a buffer area around the host vehicle; and monitor a violation of the safety envelope based on a comparison of the safety envelope and a positional relationship between the host vehicle and a target vehicle. When the target vehicle is a front vehicle and the host vehicle is a rear vehicle, the safety envelope is calculated based on a velocity and a maximum deceleration of the front vehicle, and a velocity, a maximum acceleration, and a minimum deceleration of the rear vehicle. The minimum deceleration of the rear vehicle is set to be equal to or less than the maximum deceleration of the front vehicle.

According to a fifth aspect, a processing system that performs processing related to driving control of a host vehicle is provided. The processing system includes a processor configured to: acquire detection information indicating a state detected in a traveling environment of the host vehicle; set a safety envelope, wherein the setting of the safety envelope includes defining a boundary, a margin, or a buffer area around the host vehicle; and monitor a violation of the safety envelope based on a comparison of the safety envelope and a positional relationship between the host vehicle and a target vehicle and a comparison of a velocity of the host vehicle and one or more limit values set with respect to the velocity of the host vehicle. When the target vehicle is a front vehicle and the host vehicle is a rear vehicle, the safety envelope is calculated based on a velocity and a maximum deceleration of the front vehicle, and a velocity, a maximum acceleration, and a minimum deceleration of the rear vehicle. When the minimum deceleration of the rear vehicle is set to be larger than the maximum deceleration of the front vehicle, the one or more limit values set with respect to the velocity of the host vehicle includes an upper limit velocity calculated by mathematical formula 1 as follows:

(Mathematical formula 1)

$$v_{limit} = \frac{b_f(a_r + b_r)\rho + \sqrt{b_r b_f\{2L(b_r - b_f) + (a_r + b_f)(a_r + b_r)\rho^2\}}}{(b_r - b_f)}$$

where $v_{limit}$ is the upper limit velocity, $b_f$ is the maximum deceleration of the front vehicle, $a_r$ is the maximum acceleration of the rear vehicle, $b_r$ is the minimum deceleration of the rear vehicle, ρ is a response time, and L is a vehicle length of the host vehicle.

According to a sixth aspect, a processing system that performs processing related to driving control of a host vehicle is provided. The processing system includes a processor configured to: acquire detection information indicating a state detected in a traveling environment of the host vehicle; set a safety envelope, wherein the setting of the safety envelope includes defining a boundary, a margin, or a buffer area around the host vehicle; and monitor a violation of the safety envelope based on a comparison of the safety envelope and a positional relationship between the host vehicle and a target vehicle. When the host vehicle is a rear vehicle, a stop distance is defined as S, when the host vehicle is a front vehicle, a stop distance is defined as P, and a total length of the host vehicle is defined as L. The boundary, the margin, or the buffer area is defined to satisfy P–S–L≤0.

According to a seventh aspect, a computer-readable non-transitory storage medium stores a processing program for performing processing related to driving control of a host vehicle. The processing program includes instruction to be executed by a processor, and the instructions include: acquiring detection information indicating a state detected in a traveling environment of the host vehicle; setting a safety envelope, wherein the setting of the safety envelope includes defining a boundary, a margin, or a buffer area around the host vehicle; and monitoring a violation of the safety envelope based on a comparison of the safety envelope and a positional relationship between the host vehicle and a target vehicle. When the target vehicle is a front vehicle and the host vehicle is a rear vehicle, the safety envelope is calculated based on a velocity and a maximum deceleration of the front vehicle, and a velocity, a maximum acceleration, and a minimum deceleration of the rear vehicle. The minimum deceleration of the rear vehicle is set to be equal to or less than the maximum deceleration of the front vehicle.

According to an eighth aspect, a computer-readable non-transitory storage medium stores a processing program for performing processing related to driving control of a host vehicle. The processing program includes instructions to be executed by a processor, and the instructions include acquiring detection information indicating a state detected in a traveling environment of the host vehicle; setting a safety envelope, wherein the setting of the safety envelope includes defining a boundary, a margin, or a buffer area around the host vehicle; and monitoring a violation of the safety envelope based on a comparison of the safety envelope and a positional relationship between the host vehicle and a target vehicle and a comparison of a velocity of the host vehicle and one or more limit values set with respect to the velocity of the host vehicle. When the target vehicle is a front vehicle and the host vehicle is a rear vehicle, the safety envelope is calculated based on a velocity and a maximum deceleration of the front vehicle, and a velocity, a maximum acceleration, and a minimum deceleration of the rear vehicle. When the minimum deceleration of the rear vehicle is set to be larger than the maximum deceleration of the front vehicle, the one or more limit values set with respect to the velocity of the host vehicle includes an upper limit velocity calculated by mathematical formula 1 as follows:

(Mathematical formula 1)

$$v_{limit} = \frac{b_f(a_r + b_r)\rho + \sqrt{b_r b_f\{2L(b_r - b_f) + (a_r + b_f)(a_r + b_r)\rho^2\}}}{(b_r - b_f)}$$

where $v_{limit}$ is the upper limit velocity, $b_f$ is the maximum deceleration of the front vehicle, $a_r$ is the maximum acceleration of the rear vehicle, $b_r$ is the minimum deceleration of the rear vehicle, ρ is a response time, and L is a vehicle length of the host vehicle.

According to a ninth aspect, a computer-readable non-transitory storage medium stores a processing program for performing processing related to driving control of a host vehicle. The processing program includes instructions to be executed by a processor, and the instructions includes: acquiring detection information indicating a state detected in a traveling environment of the host vehicle; setting a safety envelope; and monitoring a violation of the safety envelope based on a comparison of the safety envelope and a positional relationship between the host vehicle and a target vehicle. The setting of the safety envelope includes defining a boundary, a margin, or a buffer area around the host vehicle. When the host vehicle is a rear vehicle, a stop distance is defined as S, when the host vehicle is a front vehicle, a stop distance is defined as P, and a total length of the host vehicle is defined as L. The boundary, the margin, or the buffer area is defined to satisfy P–S–L≤0.

According to the first, fourth, and seventh aspects, when the minimum deceleration of the rear vehicle is set to be equal to or less than the maximum deceleration of the front vehicle, even when a vehicle ahead of a host vehicle changes a lane in a situation where three or more vehicles are traveling in a row, it is possible to reduce a case where the host vehicle is determined to violate the safety envelope. Thus, usefulness of monitoring results for the safety envelope violation can be improved.

Even in the second, third, fifth, sixth, eighth, and ninth aspects, when the host vehicle travelling between the front vehicle and the rear vehicle changes a lane in a situation where three or more vehicles are traveling in a row, it is possible to reduce a case where other vehicles travelling in front or rear are determined to violate the safety envelope.

Hereinafter, multiple embodiments according to the present disclosure will be described with reference to the drawings. Duplicate description may be omitted by assigning the same reference numerals to the corresponding configuration elements in each embodiment. When only a part of the configuration is described in each embodiment, the configurations of the other embodiments described above can be applied to the other parts of the configuration. Not only the combinations of the configurations explicitly specified in the description of each embodiment, but also the configurations of the multiple embodiments can be partially combined even if they are not explicitly specified unless there is a particular problem with the combination.

FIGS. 1 to 5 provide descriptions of terms associated with each embodiment of the present disclosure. Meanwhile, definitions of the terms are not interpreted as being limited to the descriptions illustrated in FIGS. 1 to 5, and are interpreted without departing from the gist of the present disclosure.

First Embodiment

A processing system 1 of a first embodiment illustrated in FIG. 6 performs processing related to driving control of a host moving object (hereinafter, referred to as driving control process). From the viewpoint of the host vehicle 2, the host vehicle 2 can also be said to be a subject vehicle (ego-vehicle). The host moving object as a target on which the processing system 1 performs the driving control process is a host vehicle 2 illustrated in FIG. 7. The host vehicle 2 can be said to be a subject vehicle (ego-vehicle) for the processing system 1 when, for example, the entire processing system 1 is mounted in the host vehicle 2.

In the host vehicle 2, autonomous driving is executed. The autonomous driving is classified into levels according to the degree of manual intervention by an occupant in a dynamic driving task (hereinafter, referred to as DDT). The autonomous driving may be realized through autonomous traveling control, such as conditional driving automation, altitude driving automation, or full driving automation, in which the operating system executes all DDTs. The autonomous driving may be realized in an advanced driver-assistance control, such as driving assistance or partial driving automation, in which a driver as the occupant executes some or all of the DDT. The autonomous driving may be realized by either one, combination, or switching between autonomous traveling control and advanced driver-assistance control.

Figure 7:
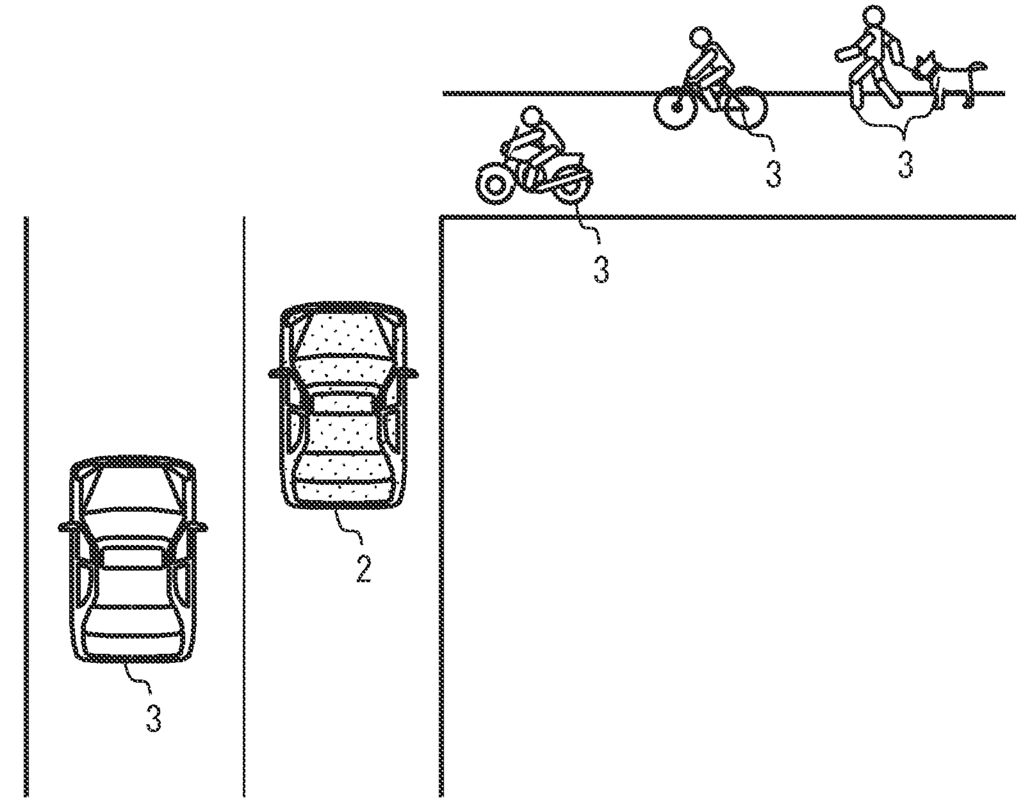
FIG. 7 is a schematic diagram illustrating a traveling environment of a host vehicle to which the first embodiment is applied.
Figure 8:
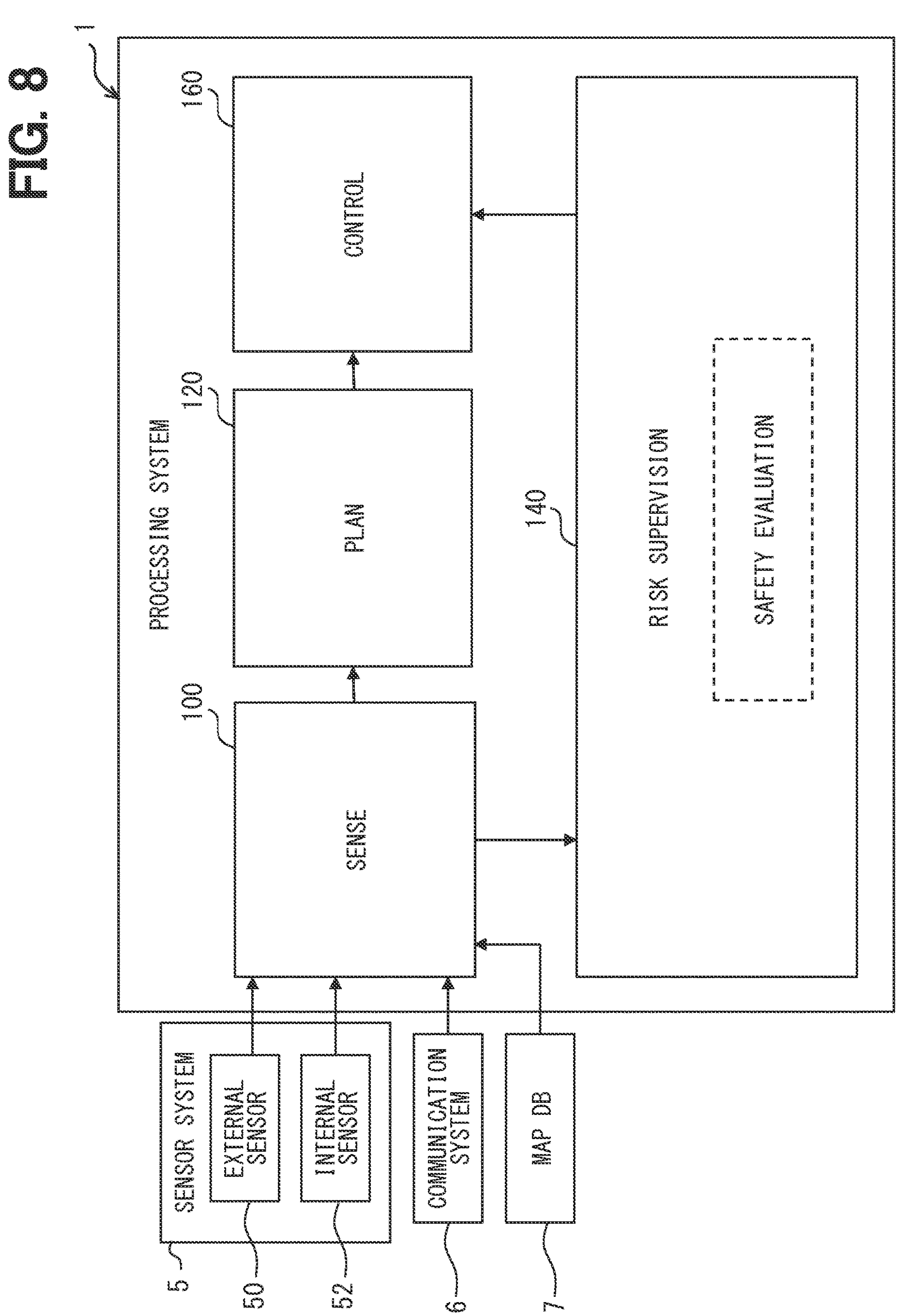
FIG. 8 is a block diagram illustrating the processing system of the first embodiment.

A sensor system 5, a communication system 6, a map data base (DB) 7, and an information presentation system 4 illustrated in FIGS. 6 and 8 are mounted in the host vehicle 2. The sensor system 5 acquires sensor data which is usable by the processing system 1 by detecting an outside and an inside of the host vehicle 2. For this purpose, the sensor system 5 includes an external sensor 50 and an internal sensor 52.

The external sensor 50 may detect targets existing in the outside of the host vehicle 2. The target detection type external sensor 50 is at least one type of, for example, camera, light detection and ranging/laser imaging detection and ranging (LiDAR), laser radar, millimeter wave radar, ultrasonic sonar, and the like. The external sensor 50 may detect a state of the atmosphere in the outside of the host vehicle 2. The atmosphere detection type external sensor 50 is at least one type of, for example, an outside air temperature sensor, a humidity sensor, and the like.

The internal sensor 52 may detect specific physical quantities related to vehicle motion (hereinafter, referred to as kinematic properties) in the inside of the host vehicle 2. The physical quantity detection type internal sensor 52 is at least one type of, for example, a speed sensor, an acceleration sensor, a gyro sensor, and the like. The internal sensor 52 may detect a state of an occupant in the inside of the host vehicle 2. The occupant detection type internal sensor 52 is at least one type of, for example, an actuator sensor, a driver status monitor, a biosensor, a seating sensor, an in-vehicle device sensor, and the like. As the actuator sensor in particular, at least one type of, for example, an accelerator sensor, a brake sensor, a steering sensor, and the like, which detects an operating state of the occupant with respect to the motion actuator of the host vehicle 2, is adopted.

The communication system 6 acquires communication data which is usable by the processing system 1 by wireless communication. The communication system 6 may receive a positioning signal from an artificial satellite of a global navigation satellite system (GNSS) existing in the outside of the host vehicle 2. The positioning type communication system 6 is, for example, a GNSS receiver or the like. The communication system 6 may transmit and receive a communication signal to and from a V2X system existing in the outside of the host vehicle 2. The V2X type communication system 6 has at least one type of, for example, a dedicated short range communications (DSRC) communication device and a cellular V2X (C-V2X) communication device. The communication system 6 may transmit and receive communication signals to and from a terminal existing in the inside of the host vehicle 2. The terminal communication type communication system 6 is at least one type of, for example, Bluetooth (registered trademark) device, Wi-Fi (registered trademark) device, infrared communication device, and the like.

The map DB 7 stores map data which is usable by the processing system 1. The map DB 7 includes at least one type of non-transitory tangible storage medium of, for example, a semiconductor memory, a magnetic medium, an optical medium, and the like. The map DB 7 may be a DB of a locator for estimating a self-state amount of the host vehicle 2 including its own position. The map DB may be a DB of a navigation unit that navigates a travel path of the host vehicle 2. The map DB 7 may be constructed by a combination of multiple types of DBs.

The map DB 7 acquires and stores the latest map data through communication and the like with an external center via the V2X type communication system 6, for example. The map data is two-dimensional or three-dimensional data as a data representing a traveling environment of the host vehicle 2. Digital data of a high definition map may be adopted as the three-dimensional map data. The map data may include road data representing at least one type of, for example, a positional coordinate, a shape, and a road surface condition of a road structure. The map data may include marking data representing at least one type of, for example, a traffic sign, a road marking, and a positional coordinate and a shape of a lane marking attached to a road. The marking data included in the map data may represent, for example, a traffic-control sign, an arrow marking, a lane marking, a stop line, a direction sign, a landmark beacon, a rectangular sign, a business sign, or a line pattern change of a road, among landmarks. The map data may include structure data representing at least one type of positional coordinates, a shape, and the like of a building and a traffic light facing the road, for example. The marking data included in the map data may represent landmarks such as a streetlight, an edge of the road, a reflecting plate, a pole, and a back side of the traffic sign, for example.

The information presentation system 4 presents notification information to an occupant including a driver of the host vehicle 2. The information presentation system 4 includes a visual presentation unit, an auditory presentation unit, and a cutaneous sensation presentation unit. The visual presentation unit presents notification information by stimulating a visual sense of the occupant. The visual presentation unit is at least one type of, for example, a head-up display (HUD), a multi function display (MFD), a combination meter, a navigation unit, a light emitting unit, and the like. The auditory presentation unit presents notification information by stimulating an auditory sense of the occupant. The auditory presentation unit is at least one type of, for example, a speaker, a buzzer, a vibration unit, and the like. The cutaneous sensation presentation unit presents notification information by stimulating a cutaneous sensation of the occupant. The cutaneous sensation stimulated by the cutaneous sensation presentation unit includes at least one type of, for example, touch, temperature, wind, and the like. The cutaneous sensation presentation unit is at least one type of, for example, a steering wheel vibration unit, a driver's seat vibration unit, a steering wheel reaction force unit, an accelerator pedal reaction force unit, a brake pedal reaction force unit, an air conditioning unit, and the like.

As illustrated in FIG. 6, the processing system 1 is connected to the sensor system 5, the communication system 6, the map DB 7, and the information presentation system 4 via at least one type of, for example, a local area network (LAN), a wire harness, an internal bus, and a wireless communication line. The processing system 1 includes at least one dedicated computer. The dedicated computer constituting the processing system 1 may be an integrated electronic control unit (integrated ECU) that integrates driving control of the host vehicle 2. The dedicated computer constituting the processing system 1 may be a determination ECU that determines DDT in the driving control of the host vehicle 2. The dedicated computer constituting the processing system 1 may be a monitoring ECU that monitors the driving control of the host vehicle 2. The dedicated computer constituting the processing system 1 may be an evaluation ECU that evaluates the driving control of the host vehicle 2.

The dedicated computer constituting the processing system 1 may be a navigation ECU that navigates the travel path of the host vehicle 2. The dedicated computer constituting the processing system 1 may be a locator ECU that estimates a self-state amount including a self-position of the host vehicle 2. The dedicated computer constituting the processing system 1 may be an actuator ECU that controls a motion actuator of the host vehicle 2. The dedicated computer constituting the processing system 1 may be a human machine interface (HMI) control unit (HCU) that controls the information presentation in the host vehicle 2. The dedicated computer constituting the processing system 1 may be at least one external computer that constructs an external center or a mobile terminal capable of communicating via, for example, the communication system 6.

The dedicated computer constituting the processing system 1 includes at least one memory 10 and at least one processor 12. The memory 10 is at least one type of non-transitory tangible storage medium, such as a semiconductor memory, a magnetic medium, and an optical medium, for non-transitory storage of computer readable programs, data, and the like, for example. The processor 12 includes, as a core, at least one type of, for example, a central processing unit (CPU), a graphics processing unit (GPU), a reduced instruction set computer (RISC)-CPU, and the like.

The processor 12 executes multiple instructions included in a processing program stored as software in the memory 10. Accordingly, the processing system 1 constructs multiple functional blocks for performing the driving control process of the host vehicle 2. In this manner, in the processing system 1, the processing program stored in the memory 10 causes the processor 12 to execute multiple instructions to perform the driving control process of the host vehicle 2, thereby constructing the multiple functional blocks. The multiple functional blocks constructed by the processing system 1 include a sensing block 100 (SENSE), a planning block 120 (PLAN), a risk monitoring block 140 (RISK SUPERVISION), and a control block 160 (CONTROL), as illustrated in FIG. 8.

The sensing block 100 acquires sensor data from the external sensor 50 and internal sensor 52 of the sensor system 5. The sensing block 100 acquires communication data from the communication system 6. The sensing block 100 acquires map data from the map DB 7. The sensing block 100 detects internal and external environments of the host vehicle 2 by fusion using these acquired data as inputs. By detecting the internal and external environment, the sensing block 100 generates detection information to be given to the planning block 120 and the risk monitoring block 140 at a latter stage. In this manner, in generating the detection information, the sensing block 100 acquires data from the sensor system 5 and the communication system 6, recognizes or understands the meaning of the acquired data, and grasps a general situation including an outside situation of the host vehicle 2, its own position within the external situation, and an internal situation of the host vehicle 2 by integrating the acquired data. The sensing block 100 may provide substantially the same detection information to the planning block 120 and the risk monitoring block 140. The sensing block 100 may provide different detection information to the planning block 120 and the risk monitoring block 140.

The detection information generated by the sensing block 100 describes a state detected for each scene in the traveling environment of the host vehicle 2. The sensing block 100 may detect an object, including a road user, an obstacle, and a structure, in the outside of the host vehicle 2 to generate detection information for the object. The object detection information may represent at least one type of, for example, a distance to the object, a relative speed of the object, a relative acceleration of the object, an estimated state based on tracking detection of the object, and the like. The object detection information may further represent a type recognized or specified from a state of the detected object. The sensing block 100 may generate the detection information for a roadway on which the host vehicle 2 is traveling now and in the future by detecting the roadway. The roadway detection information may represent at least one type of, for example, state, among a road surface, a lane, a roadside, a free space, and the like.

The sensing block 100 may generate the detection information of a self-state amount by localization that presumptively detects the self-state amount including a self-position of the host vehicle 2. The sensing block 100 may generate update information of the map data regarding the roadway of the host vehicle 2 at the same time as the detection information of the self-state amount, and feed back the update information to the map DB 7. The sensing block 100 may detect a sign associated with the roadway of the host vehicle 2 to generate the detection information for the sign. The sign detection information may represent a state of at least one type of, for example, a sign, a lane marking, a traffic light, and the like. The sign detection information may also represent a traffic rule which is recognized or specified from the state of the sign. The sensing block 100 may generate the detection information of a climate situation by detecting the climate situation for each scene in which the host vehicle 2 travels. The sensing block 100 may generate the detection information for a time by detecting the time for each traveling scene of the host vehicle 2.

The planning block 120 acquires the detection information from the sensing block 100. The planning block 120 plans driving control of the host vehicle 2 according to the acquired detection information. In planning the driving control, a control command for a navigation operation and a driver assistance operation of the host vehicle 2 is generated. The control command generated by planning block 120 may include a control parameter of controlling a motion actuator of the host vehicle 2. The motion actuator as a target to which the control command is output includes at least one type of, for example, an internal combustion engine, an electric motor, a power train in which these are combined, a brake device, a steering device, and the like.

The planning block 120 may use a safety model described according to a driving policy and its safety to generate the control command to comply with the driving policy. The driving policy followed by the safety model is defined, for example, based on a vehicle-level safety strategy that ensures safety of the intended functionality (hereinafter, referred to as SOTIF). In other words, the safety model is described by following driving policies that implement vehicle-level safety strategies and by modeling the SOTIF. The planning block 120 may train the safety model with a machine learning algorithm that back-propagates driving control results to the safety model. As the safety model to be trained, at least one type of learning model may be used among deep learning by a neural network such as deep neural network (DNN), reinforcement learning, and the like, for example.

The planning block 120 may plan a path through which the host vehicle 2 travels in the future by driving control, prior to generating the control command. The path planning may be executed by a calculation of, for example, by simulation and the like, to navigate the host vehicle 2 based on the detection information. The planning block 120 may also plan an appropriate track based on the acquired detection information for the host vehicle 2 following the planned path, prior to generating the control command. The track planned by the planning block 120 may define at least one type of, for example, a traveling position, a velocity, an acceleration, a yaw rate, and the like, in time series, as kinematic properties related to the host vehicle 2. The time series track plan constructs a scenario of a future travel by navigating the host vehicle 2. The planning block 120 may generate the track by planning using a safety model. In this case, a cost function that gives a cost to the generated track may be calculated, and the safety model may be trained by a machine learning algorithm based on the calculation result.

The planning block 120 may plan adjustment of levels of driving automation in the host vehicle 2 according to the acquired detection information. The adjustment of the levels of driving automation may also include takeover between autonomous driving and manual driving. The takeover between autonomous driving and manual driving may be realized in a scenario associated with entering or leaving an operational design domain (hereinafter, referred to as ODD) in which autonomous driving is executed, based on a setting of the operational design domain. In the leaving scenario from the operational design domain, that is, a takeover scenario from autonomous driving to manual driving, an unreasonable situation in which an unreasonable risk is determined to exist based on, for example, a safety model and the like can be cited as a use case. In this use case, the planning block 120 may plan a DDT fallback for a driver who will be a fallback ready user to give the host vehicle 2 a minimal risk manoeuvre to transition the host vehicle 2 to a minimal risk condition.

The adjustment of the levels of driving automation may include degradation traveling of the host vehicle 2. In the degradation traveling scenario, an unreasonable situation determined, for example, based on a safety model and the like when there is an unreasonable risk by a takeover to manual driving, is a use case. In this use case, the planning block 120 may plan a DDT fallback to transition the host vehicle 2 to a minimal risk condition through autonomous traveling and autonomous stopping. The DDT fallback for transitioning the host vehicle 2 to the minimal risk condition may be not only realized in the adjustment to lower the levels of driving automation, but also the adjustment to maintain the levels of driving automation with degradation traveling, for example, a minimum risk manoeuvre (MRM) and the like.

The risk monitoring block 140 acquires the detection information from the sensing block 100. The risk monitoring block 140 monitors a risk between the host vehicle 2 and other target moving objects 3 (see FIG. 7) for each scene based on the acquired detection information. The risk monitoring block 140 executes risk monitoring in time series based on the detection information to ensure the SOTIF of the host vehicle 2 to the target moving object 3. The target moving object 3 assumed in risk monitoring is another road user existing in the traveling environment of the host vehicle 2. The target moving object 3 includes a non vulnerable road user such as an automobile, a truck, a motorcycle, and a bicycle and a vulnerable road user such as a pedestrian, for example. The target moving object 3 may further include an animal.

The risk monitoring block 140 sets a safety envelope that ensures the SOTIF in the host vehicle 2, for example, based on a vehicle-level safety strategy, and the like, based on the acquired detection information for each scene. The risk monitoring block 140 may set the safety envelope between the host vehicle 2 and the target moving object 3 using a safety model that follows the driving policy described above. The safety model used to set the safety envelope may be designed to avoid potential accident liability resulting from unreasonable risk or road user misuse, subject to accident liability rules. In other words, the safety model may be designed such that the host vehicle 2 complies with accident liability rules according to a driving policy. Such a safety model includes, for example, a responsibility sensitive safety model as disclosed in U.S. Pat. No. 6,708,793 B, and the like.

In setting of the safety envelope, a safety distance may be assumed from a profile related to at least one kinematic property, based on a safety model for the host vehicle 2 and the target moving object 3 that are assumed to follow the driving policy. The safety distance defines a physics-based marginal boundary around the host vehicle 2 for a predicted motion of the target moving object 3. The safety distance may be assumed, taking into account a response time until a proper response is executed by the road user. The safety distance may be assumed to comply with accident liability rules. For example, in a scene in which a lane structure such as a lane exists, a safety distance for avoiding a risk of rear-end collision and head-on collision of the host vehicle 2 in a longitudinal direction and a safety distance for avoiding a risk of side-surface collision of the host vehicle 2 in a lateral direction may be calculated. On the other hand, in a scene in which there is no lane structure, a safety distance for avoiding a risk of track collision in any direction of the host vehicle 2 may be calculated.

The risk monitoring block 140 may specify a situation for each scene of relative motions between the host vehicle 2 and the target moving object 3, prior to a setting of the safety envelope described above. For example, in a scene in which a lane structure such as a lane exists, a situation in which a risk of rear-end collision and head-on collision is assumed in the longitudinal direction and a situation in which a risk of side-surface collision is assumed in the lateral direction may be specified. In the specifying of these situations in the longitudinal direction and the lateral direction, a state amount related to the host vehicle 2 and the target moving object 3 may be converted into a coordinate system in which a straight lane is premised. On the other hand, in a scene in which there is no lane structure, a situation in which there is a risk of track collision of the host vehicle 2 in any direction may be specified. At least a part of the situation-specific function described above may be executed by the sensing block 100, and a situation-specific result may be given to the risk monitoring block 140 as the detection information.

The risk monitoring block 140 executes safety determination between the host vehicle 2 and the target moving object 3, based on the set safety envelope and the acquired detection information for each scene. The safety determination is also referred to as safety evaluation. The risk monitoring block 140 tests whether a traveling scene interpreted based on the detection information between the host vehicle 2 and the target moving object 3 has a safety envelope violation to realize the safety determination. When a safety distance is assumed in a setting of the safety envelope, it may be determined that there is no violation of the safety envelope when an actual distance between the host vehicle 2 and the target moving object 3 exceeds the safety distance. On the other hand, when the actual distance between the host vehicle 2 and the target moving object 3 becomes equal to or less than the safety distance, it may be determined that the safety envelope is violated.

The risk monitoring block 140 may calculate a reasonable scenario with a simulation to give the host vehicle 2 an appropriate action to take a proper response when it is determined that the safety envelope is violated. In the reasonable scenario simulation, by estimating state transitions between the host vehicle 2 and the target moving object 3, an action to be taken for each transition state may be set as a constraint or restriction on the host vehicle 2. In a setting of the action, a limit value assumed for at least one type of kinematic property to be applied to the host vehicle 2 may be calculated to limit the kinematic property as a constraint or restriction on the host vehicle 2.

The risk monitoring block 140 may directly calculate the limit value for compliance with accident liability rules, from a profile related to at least one type of kinematic property, based on the safety model for the host vehicle 2 and target moving object 3 assumed to comply with a driving policy. It can be said that the direct calculation of the limit value is itself a setting of the safety envelope and a setting of the constraint or restriction on driving control. Therefore, when an actual value that is safer than the limit value is detected, it may be determined that the safety envelope is not violated. On the other hand, when an actual value outside the limit value is detected, it may be determined that the safety envelope is violated.

The risk monitoring block 140 may store at least one type of, for example, evidence information among detection information used to set the safety envelope, determination information representing a determination result of the safety envelope, detection information that influenced the determination result, simulated scenario, and the like in the memory 10. The memory 10 storing the evidence information may be mounted in the host vehicle 2, or may be installed at an external center and the like outside the host vehicle 2, for example, depending on a type of dedicated computer constituting the processing system 1. The evidence information may be stored in an unencrypted state, or in an encrypted or hashed state. The storing of the evidence information is executed at least when it is determined that the safety envelope is violated. Of course, the storing of the evidence information may be not executed even when it is determined that there is no violation of the safety envelope. The evidence information when it is determined that there is no violation of the safety envelope can be used as a lagging measure at a time of storing, and can also be used as a leading measure in the future.

The control block 160 acquires the control command from the planning block 120. The control block 160 acquires determination information regarding the safety envelope from the risk monitoring block 140. The control block 160 executes the planned driving control of the host vehicle 2 in accordance with the control command when the control block 160 acquires the determination information in that the safety envelope is not violated.

On the other hand, when the control block 160 acquires the determination information indicating that the safety envelope is violated, the control block 160 gives a constraint or restriction on the planned driving control of the host vehicle 2 according to the driving policy based on the determination information. A constraint or restriction on the driving control may be a functional restriction. A constraint or restriction on the driving control may be a degraded constraint. The constraint or restriction on the driving control may be a constraint or restriction different from the above-described examples. The constraint or restriction is applied to the driving control by constraining or restricting the control command. When a reasonable scenario is simulated by the risk monitoring block 140, the control block 160 may limit the control command according to the scenario. At this time, when a limit value is set for the kinematic property of the host vehicle 2, a control parameter of a motion actuator included in the control command may be corrected based on the limit value.

Hereinafter, details of the first embodiment will be described.

Figure 9:
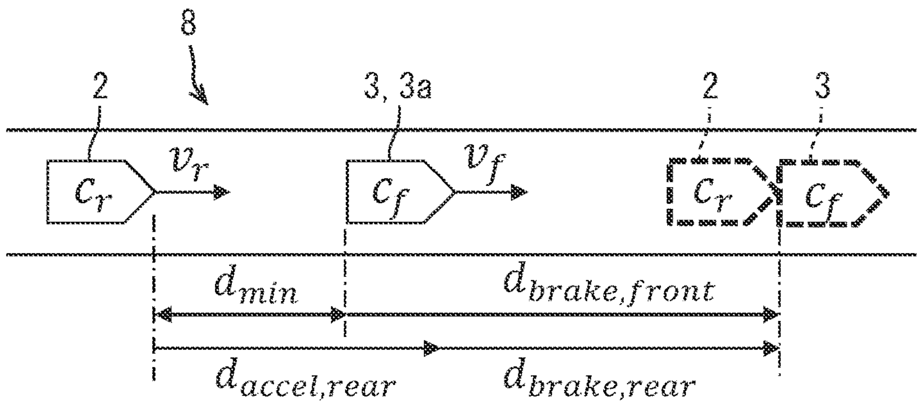
FIG. 9 is a diagram in which the host vehicle is traveling as a following vehicle of a target vehicle.

In the first embodiment as illustrated in FIG. 9, a lane structure 8 with separated lanes is assumed. The lane structure 8 regulates movement of the host vehicle 2 and the target moving object 3 with a direction in which the lane extends as the longitudinal direction. The lane structure 8 regulates the movement of the host vehicle 2 and the target moving object 3 with a width direction or a direction in which the lanes line up as the lateral direction.

A driving policy between the host vehicle 2 and the target moving object 3 in the lane structure 8 is defined by the following (A) to (E) and the like, when the target moving object 3 is the target vehicle 3*a*, for example. A front direction with the host vehicle 2 as a reference means, for example, a traveling direction of the host vehicle 2 on a turning circle at a current steering angle, a traveling direction of a straight line passing through a center of gravity of the vehicle perpendicular to a vehicle axle of the host vehicle 2, a traveling direction on an axis of focus of expansion (FOE) of the same camera from a front camera module in the sensor system 5 of the host vehicle 2, or the like.

(A) Do not hit a vehicle traveling in front from behind (Do not hit someone from behind).

(B) Do not cut in recklessly between other vehicles (Do not cut-in recklessly).

(C) Yield to another vehicle even when own vehicle has a priority (Right-of-way is given, not taken).

(D) Be cautious in areas with limited visibility.

(E) If the host vehicle can avoid a crash without causing another one, take a reasonable action for that purpose (If you can avoid an accident without causing another one, you must do it).

With a model following a driving policy, a safety model by modeling by the SOTIF assumes an action of a road user that does not lead to an unreasonable situation as an appropriate and reasonable action to be taken. The unreasonable situation between the host vehicle 2 and the target moving object 3 in the lane structure 8 includes head-on collision, rear-end collision, and side-surface collision. The reasonable action in the head-on collision includes, for example, a brake or the like of a vehicle traveling in an opposite direction when the target moving object 3 with respect to the host vehicle 2 is the target vehicle 3*a*. The reasonable action in the rear-end collision includes, for example, that a vehicle traveling in front does not brake more than a certain amount suddenly, a vehicle traveling behind avoids the rear-end collision, and the like when the target moving object 3 with respect to the host vehicle 2 is the target vehicle 3*a*. The reasonable action in the side-surface collision includes, for example, that vehicles running side by side steer in directions in which the vehicles are away from each other and the like when the target moving object 3 with respect to the host vehicle 2 is the target vehicle 3*a*. When assuming the reasonable action, a state amount related to the host vehicle 2 and the target moving object 3 is converted into an orthogonal coordinate system that defines the longitudinal direction and the lateral direction, assuming the straight and planar shape lane structure 8, in any of the lane structure 8 having curved lanes or the lane structure 8 having high and low lanes.

The safety model is preferably designed according to accident liability rules, which assume that a moving object without a reasonable action is responsible for an accident.

The safety model used to monitor a risk between the host vehicle 2 and the target moving object 3 under the accident liability rule in the lane structure 8 sets a safety envelope for the host vehicle 2 to the host vehicle 2 such that the reasonable action avoids potential accident liability. Therefore, the risk monitoring block 140 in a situation in which the processing system 1 as a whole is normal compares an actual distance between the host vehicle 2 and the target moving object 3 with a safety distance based on the safety model for each traveling scene to determine whether the safety envelope is violated. When the safety envelope is violated, the risk monitoring block 140 in the normal situation simulates a scenario for giving a reasonable action to the host vehicle 2. With the simulation, the risk monitoring block 140 sets, as a constraint or restriction on the driving control in the control block 160, a limit value related to at least one of a velocity, an acceleration, and the like, for example. In the following description, a violation determination function and a constraint/restriction setting function under the normal situation are referred to as a normal safety function.

In FIG. 9, the host vehicle 2 is a following vehicle of the target vehicle 3*a*. The target vehicle 3*a* is an example of the target moving object 3. The target moving object 3 is a moving object that performs a violation determination with the host vehicle 2. Another moving object may not exist between the target moving object 3 and the host vehicle 2. The other moving object may exist between the target moving object 3 and the host vehicle 2, and in this case also, a safety distance $d_{min}$ can be calculated.

Figure 10:
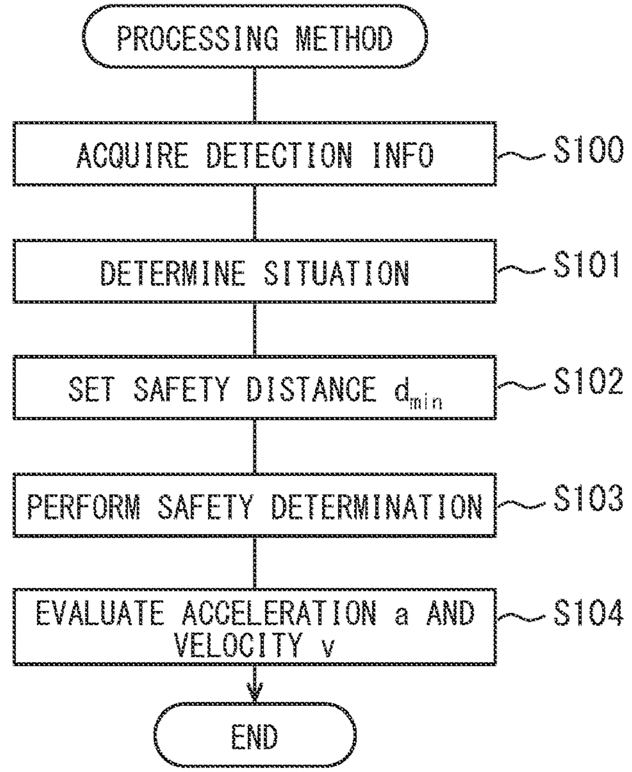
FIG. 10 is a flowchart illustrating a processing method executed by a risk monitoring block.

FIG. 10 illustrates a processing method executed by the risk monitoring block 140. The processing method is repeatedly executed at regular intervals. In S100 of the processing method, the risk monitoring block 140 acquires detection information from the sensing block 100.

In S101 of the processing method, a situation is determined based on the detection information acquired in S100. The situation is determined for each target moving object 3. A reason for determining the situation is to select a method of a violation determination. The situation determined here may be a scenario or a scene, and the determination may be obtained by collectively determining multiple target moving objects 3 existing around the host vehicle 2.

The situation may be determined separately in the longitudinal direction and in the lateral direction. The situation in the longitudinal direction may include a situation in which a rear-end collision is determined and a situation in which a head-on collision is determined. An example of the situation in which the rear-end collision is determined may include a situation in which the host vehicle 2 is a preceding vehicle and the target vehicle 3*a* is a following vehicle, and a situation in which the target vehicle 3*a* is a preceding vehicle and the host vehicle 2 is a following vehicle. The situation in which the head-on collision is determined may include a situation in which both the host vehicle 2 and the target vehicle 3*a* are traveling in a correct lane, a situation in which only one of the host vehicle 2 and the target vehicle 3*a* is traveling in a correct lane, a situation in which both the host vehicle 2 and the target vehicle 3*a* are traveling in a wrong lane, and a situation in which lane information is unknown. The situation in which the vehicle is traveling in the correct lane may be a situation in which the vehicle is traveling in a lane along a normal traveling direction determined by a regulation, a traffic sign, and a road marking. An example of the situation in which both the host vehicle 2 and the target vehicle 3*a* are traveling in the correct lane includes a situation in which the host vehicle 2 and the target vehicle 3*a* are traveling on a road without a centerline and the like. An example of the situation in which only one of the vehicles is traveling in the correct lane includes a situation in which the one of the vehicles (this vehicle may be an emergency vehicle) runs out to an oncoming lane to overtake the other vehicle (this vehicle may be a vehicle parked on a road) on a single-lane road, and a situation in which the one of the vehicles is reversely traveling on a one-way road, and the like. An example of the situation in which both the vehicles are traveling in the wrong lane includes a situation in which both are traveling in a traveling prohibited section and the like. An example of the situation in which a lane situation is unknown includes a situation in which a road on which the vehicle is traveling is a road not published on a map, and the like. The situation in the lateral direction may include a situation in which a side-surface collision is determined. The situation in which the side-surface collision is determined may include a situation in which the host vehicle 2 is on right and the target vehicle 3*a* is on left, and a situation in which the host vehicle 2 is on the left and the target vehicle 3*a* is on the right.

In S102 of the processing method, the safety distance $d_{min}$ is set. The safety distance $d_{min}$ is set for each target moving object 3. The safety distance $d_{min}$ may be set by a calculation expression that varies depending on the situation determined in S101. The calculation expression for calculating the safety distance $d_{min}$ is set in advance. The calculation expression for calculating the safety distance $d_{min}$ may be calculated by using a velocity v and an acceleration a of each of the host vehicle 2 and the target vehicle 3*a*. The details of the calculation of the safety distance $d_{min}$ will be described below. The safety distance can be rephrased as an appropriate distance to be maintained for another road user. The setting of the safety distance $d_{min}$ may be substantially a setting of a safety envelope including defining a physics-based boundary, margin, or buffer area around the host vehicle. Alternatively, the boundary, the margin, or the buffer area included in the setting of the safety envelope may be defined based on the setting of the safety distance $d_{min}$. The safety envelope may be set based on a minimum set of assumptions defined for each scenario.

In S103 of the processing method, a safety determination (also referred to as violation determination of safety envelope) is made. The safety determination is made by comparing the safety envelope with a current positional relationship between the host vehicle 2 and the target moving object 3. Specifically, the safety determination may be made by comparing the safety distance $d_{min}$ set for each situation and a current distance between the host vehicle 2 and the target moving object 3. When the safety distance $d_{min}$ is shorter than the current distance, it is determined that the safety envelope is in a violation state. That is, when the current distance is longer than the safety distance $d_{min}$, it is determined that the safety envelope is not in the violation state. The violation determination is performed for each target moving object 3.

In S104 of the processing method, the acceleration a and the velocity v are evaluated. This evaluation is performed by comparing a limit value on the acceleration a and a limit value on the velocity v, and the current acceleration a and velocity v of the host vehicle 2.

The limit value on the acceleration a is determined based on a result of the violation determination. As the result of the violation determination, when there is the determination result in which the safety envelope is not in the violation state, no new limit is applied to the acceleration a. That is, a limit on acceleration a already applied for some other reason may continue to be applied. When there is a determination result in which the safety envelope is in the violation state, the acceleration a on the side later determined to be in the violation state of the safety envelope, either in the longitudinal direction or the lateral direction, is limited, or a brake may be required. That is, even when the safety envelope is in the violation state in either the longitudinal direction or the lateral direction, it is not necessary to limit the acceleration a or apply the brake. For example, at a one-lane road, a safety distance between the host vehicle 2 and a preceding vehicle as the target moving object 3 in the lateral direction cannot be ensured. In this state, when the vehicle later transitions to a state in which a safety distance in the longitudinal direction cannot be ensured, there is a possibility that a rear-end collision will occur. In such a situation, by limiting the acceleration a of the host vehicle 2 or by causing the host vehicle 2 to brake, it is possible to transition to a state in which the safety distance in the longitudinal direction is ensured.

The limit value on the velocity v may be set based on a distance from an intersection of the host vehicle 2, a position of the virtual other vehicle, and an assumed velocity. In order to set the limit value on the velocity v, consideration may be given to whether the host vehicle 2 or the virtual other vehicle is traveling on a priority road, or which of the host vehicle 2 or the other vehicle is closer to the intersection. For example, when the host vehicle 2 is traveling on the priority road and the virtual other vehicle is closer to the intersection than the host vehicle 2, an upper limit value is set as the limit value on the velocity v. Either one or both of the upper limit value and a lower limit value on the velocity v can be set as the limit value on the velocity v.

When multiple limit values for the velocity v are set, multiple limit values are integrated and evaluated. In the integration, a most limited value among the multiple limit values may be used as a limit value to be compared with the current velocity v of the host vehicle 2.

The result of the evaluation is given to the control block 160. The result of the evaluation may be included in the determination information, and given to the control block 160. The determination information includes the result of the safety determination executed in S103. The result of the safety determination executed in S103 can also be said to be a determination result of the safety envelope.

Next, a calculation method of the safety distance $d_{min}$ will be described in detail. FIG. 9 also illustrates the safety distance $d_{min}$ in a situation in which a rear-end collision is determined. A relationship illustrated in FIG. 9 is established for the safety distance $d_{min}$ in the situation in which the rear-end collision is determined, a stop distance $d_{brake,front}$ of a vehicle $c_f$ that is a preceding vehicle, a free traveling distance $d_{reaction,rear}$ of a vehicle $c_r$ that is a following vehicle, and a braking distance $d_{brake,rear}$ of the vehicle $c_r$. In some cases, the preceding vehicle refers to a front vehicle and the following vehicle refers to a rear vehicle.

The safety distance $d_{min}$ in the situation in which the rear-end collision is determined may be a distance at which the rear-end collision does not occur even when the vehicle $c_r$, which is a following vehicle, accelerates at a maximum acceleration $a_{max,accel}$ during a response time ρ seconds and then stops by braking at a minimum deceleration $a_{min,brake}$ when the vehicle $c_f$, which is a preceding vehicle, travels at a velocity of and stops at a maximum deceleration $a_{max,brake}$. In the present embodiment, the maximum deceleration $a_{max,brake}$, the maximum acceleration $a_{max,accel}$, and the minimum deceleration $a_{min,brake}$ are set to the same values, for all vehicles equipped with the processing system 1. On the other hand, all the vehicles equipped with the processing system 1 may not be processed to set the maximum deceleration $a_{max,brake}$, the maximum acceleration $a_{max,accel}$, and the minimum deceleration $a_{min,brake}$ to the same values. The same scenario is selected as a reasonably foreseeable scenario for each vehicle, and as a result of the selection, the maximum deceleration $a_{max,brake}$, the maximum acceleration $a_{max,accel}$, and the minimum deceleration $a_{min,brake}$ may have substantially the same values.

The maximum accelerations $a_{max,accel}$ may be different from the acceleration a when the vehicle exhibits its maximum acceleration capability. For example, the maximum acceleration $a_{max,accel}$ may be a value set from the viewpoint of continuing safe traveling. For example, the maximum acceleration $a_{max,accel}$ may be a reasonably foreseeable maximum assumed acceleration that the target moving object 3 (other road users) could exhibit. The maximum deceleration $a_{max,brake}$ may be different from a deceleration when the vehicle exhibits its maximum deceleration capability. For example, the minimum deceleration $a_{min,brake}$ may be a value set from the viewpoint of continuing safe traveling. For example, the minimum deceleration $a_{min,brake}$ may be a reasonably foreseeable minimum assumed deceleration that the target moving object 3 (other road users) could exhibit. The response time ρ is a time after the preceding vehicle starts deceleration until the following vehicle starts deceleration. For example, the response time ρ may be set in advance. For example, the response time ρ may be a reasonably foreseeable maximum assumed response time that the target moving object 3 (other road users) could exhibit. The deceleration is defined as a positive value. The deceleration indicates deceleration with a minus sign.

Figure 11:
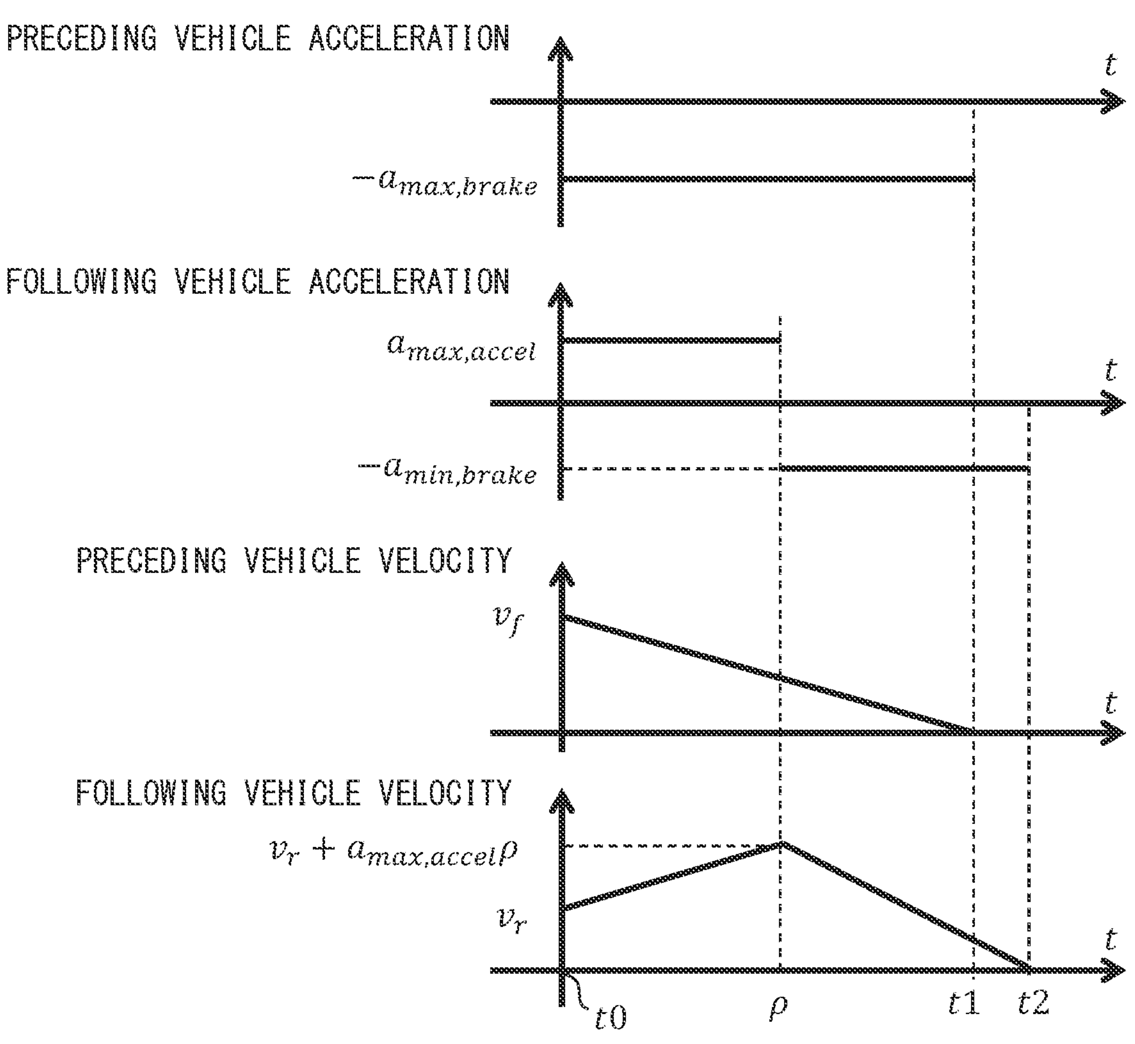
FIG. 11 is a diagram illustrating a temporal change in velocity and acceleration of a preceding vehicle and the following vehicle.

FIG. 11 illustrates a temporal change of the velocity v and the acceleration a of a preceding vehicle and a following vehicle at this time. The acceleration of the preceding vehicle is constant at $-a_{max,brake}$ from a time t0 to a time t1. The acceleration of the following vehicle is $a_{max,accel}$ from the time t0 until the response time ρ elapses, and $-a_{max,brake}$ after the response time ρ elapses to a time t2. Therefore, a temporal change of the preceding vehicle velocity is illustrated in a third graph, and a temporal change of the following vehicle velocity is illustrated in a fourth graph.

From FIG. 11, as illustrated in FIG. 12A to FIG. 12D, the stop distance $d_{brake,front}$ of the preceding vehicle can be represented by Expression 1, the free traveling distance $d_{reaction,rear}$ of the following vehicle can be represented by Expression 2, and the braking distance $d_{brake,rear}$ of the following vehicle can be represented by Expression 3. The safety distance $d_{min}$ can be represented by Expression 4.

Figure 13:
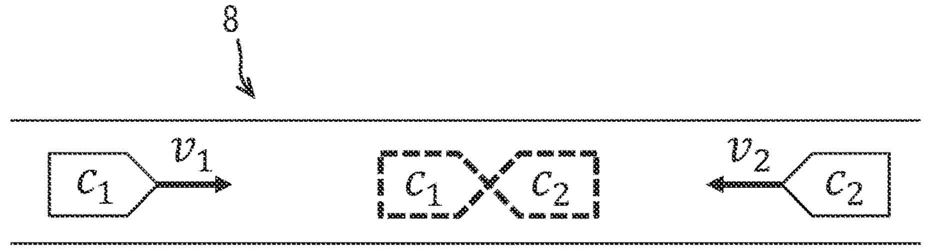
FIG. 13 is a diagram in which two vehicles are traveling facing each other.

In a situation in which a head-on collision is determined, as illustrated in FIG. 13, even when a vehicle $c_1$ and a vehicle $c_2$ travel facing each other at velocities $v_1$ and $v_2$, accelerate at the maximum acceleration $a_{max,accel}$ during the response time ρ seconds, and then stop by braking at the minimum deceleration $a_{min,brake}$, a distance at which the head-on collision does not occur may be set as the safety distance $d_{min}$. Meanwhile, for a vehicle traveling in a correct lane, the minimum deceleration may be set to be $a_{min,brake}$, correct smaller than $a_{min,brake}$. Meaning of the maximum acceleration $a_{max,accel}$ and the minimum deceleration $a_{min,brake}$ is the same as in a situation in which a rear-end collision is determined.

Figure 14:
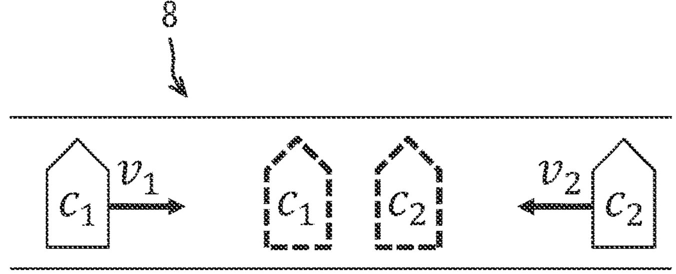
FIG. 14 is a diagram in which two vehicles are traveling adjacent to each other.

In a situation in which a side-surface collision is determined, as illustrated in FIG. 14, even when the vehicles $c_1$ and $c_2$ travel adjacent to each other at the lateral velocities $v_1$ and $v_2$, accelerate at a maximum acceleration $a_{max,accel,lat}$ during the response time ρ seconds, and then decelerate in the lateral direction at a minimum deceleration $a_{min,brake,lat}$, a distance at which a minimum distance μ is spaced and the collision does not occur may be set as the safety distance $d_{min}$. For example, the maximum accelerations $a_{max,accel,lat}$ may be a value set from the viewpoint of continuing safe traveling. For example, the maximum acceleration $a_{max,accel,lat}$ may be a reasonably foreseeable maximum assumed acceleration that the target moving object 3 (other road users) could exhibit. For example, the minimum decelerations $a_{min,brake,lat}$ may be a value set from the viewpoint of continuing safe traveling. For example, the minimum deceleration $a_{min,brake,lat}$ may be a reasonably foreseeable minimum assumed deceleration that the target moving object 3 (other road users) could exhibit. The minimum distance μ is a value set in advance.

Figure 15:
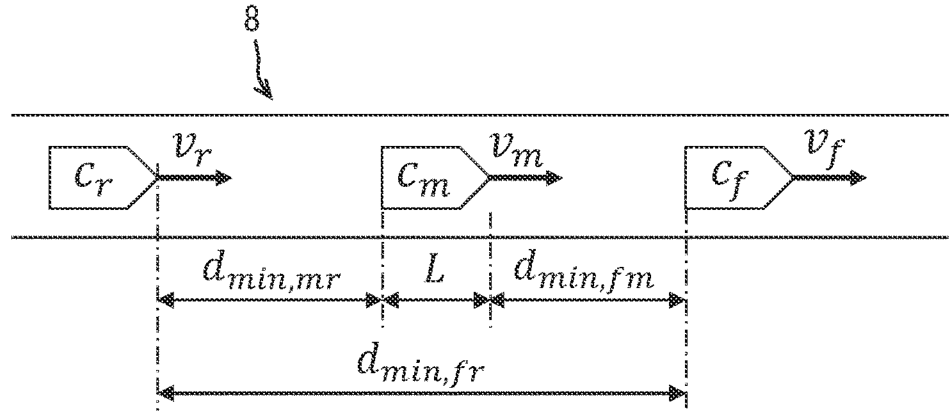
FIG. 15 is a diagram in which three vehicles are traveling in a row.

In FIG. 15, a vehicle $c_m$ is traveling between the vehicle $c_f$ and the vehicle $c_r$. The processing system 1 also considers a scenario or a scene in which three vehicles are traveling in the same direction in a row, as illustrated in FIG. 15. It is assumed that the vehicle $c_r$ cannot detect the vehicle $c_f$. At this time, when following Expression 5 holds, although each of the vehicle $c_m$ and the vehicle $c_r$ maintains the safety distance $d_{min}$ with the preceding vehicle, the vehicle $c_r$ and the vehicle $c_f$ cannot maintain the safety distance $d_{min}$. In the following expressions, $d_{min,mr}$ is a safety distance between the vehicles $c_m$ and $c_r$, $d_{min,fm}$ is a safety distance between the vehicles $c_f$ and $c_m$ and $d_{min,fr}$ is a safety distance between vehicles $c_f$ and $c_r$. L is a vehicle length of the vehicle $c_m$.

$$d_{min,mr}d_{min,fm}+L<d_{min,fr} \quad \text{(Expression 5)}$$

When the expression described above holds and the vehicle $c_m$ changes a lane, it is determined that the vehicle $c_r$ and the vehicle $c_f$ violate a safety envelope. In order to avoid the transition to the minimum risk condition, it is preferable to create a situation in which the violation of the safety envelope is unlikely to occur, in other words, to reduce the determination of the violation of the safety envelope. Therefore, the processing system 1 sets the minimum deceleration $a_{min,brake}$ of the following vehicle to be equal to or less than the maximum deceleration $a_{max,brake}$ of the preceding vehicle. That is, the minimum deceleration $a_{min,brake}$ of the following vehicle and the maximum deceleration $a_{max,brake}$ of the preceding vehicle are set to satisfy Expression 6.

$$a_{min,brake} \leq a_{max,brake} \quad \text{(Expression 6)}$$

In this manner, by setting the minimum deceleration $a_{min,brake}$ of the following vehicle and the maximum deceleration $a_{max,brake}$ of the preceding vehicle, the safety distance $d_{min}$ can also be ensured between the vehicle $c_f$ and the vehicle $c_r$. The reason for this will be described.

When Expression 7 obtained by changing a magnitude relationship between the right side and the left side of Expression 5 is established, it can be determined that the vehicle $c_f$ and the vehicle $c_r$ are safe.

$$d_{min,mr}+d_{min,fm}+L \geq d_{min,fr} \quad \text{(Expression 7)}$$

The safety distance $d_{min}$ is a following vehicle free traveling distance+a following vehicle braking distance—a preceding vehicle braking distance. According to the concept to be described by using FIGS. 11 and 12, the safety distance $d_{min}$ between the respective vehicles, the following vehicle free traveling distance, the following vehicle braking distance, and the preceding vehicle braking distance can be represented by the character expression illustrated in FIG. 16.

By substituting the preceding vehicle braking distance, the following vehicle free traveling distance, and the following vehicle braking distance illustrated in FIG. 16 into Expression 7, Expression 8 illustrated in FIG. 17 is obtained. By transforming Expression 8, Expression 9 illustrated in FIG. 18 is obtained. In Expression 9, since $a_{max,accel}$, $a_{min,brake}$, ρ, $v_m$, and L are positive numbers, the second, third, and fourth terms on the left side are all values equal to or less than 0.

When Expression 6 is satisfied, the first term on the left side also has a value equal to or less than 0. From the above, when Expression 6 is satisfied, Expression 9 always holds. Therefore, when Expression 6 is satisfied, Expression 7 is also established.

As described above, all the minimum deceleration $a_{min,brake}$ of the following vehicle and the maximum deceleration $a_{max,brake}$ of the preceding vehicle are set values. Therefore, the processing system 1 sets these values to satisfy Expression 6. This setting is reflected in the calculation of the safety distance $d_{min}$ and the control of the vehicle.

In the processing method of the first embodiment described above, the minimum deceleration $a_{min,brake}$ used when becoming the following vehicle is made equal to or less than the maximum deceleration $a_{max,brake}$ used when becoming the preceding vehicle. In this manner, even when a vehicle one ahead of the host vehicle 2 changes a lane in a situation in which three vehicles are traveling in a row, it is possible to reduce that the host vehicle 2 is determined to violate a safety envelope.

Second Embodiment

A second embodiment is a modification of the first embodiment.

In the second embodiment as well, all vehicles equipped with the processing system 1 set parameters such as the maximum deceleration $a_{max,brake}$ and the minimum deceleration $a_{min,brake}$ to the same values.

In the second embodiment, as illustrated in Expression 10 illustrated in FIG. 19A and FIG. 19B, contrary to the first embodiment, the minimum deceleration $a_{min,brake}$, which is a value used when becoming a following vehicle, is set to a value larger than the maximum deceleration $a_{max,brake}$ which is a value used when becoming a preceding vehicle.

In the second embodiment, in a velocity evaluation in S104, in addition to the limit value on the velocity v described in the first embodiment, an upper limit velocity $v_{limit}$ calculated by Expression 11 is also defined as a limit value of the velocity v. In Expression 11, $b_f$, $a_r$, and $b_r$ are the maximum deceleration $a_{max,brake}$, the maximum acceleration $a_{max,accel}$, and the minimum deceleration $a_{min,brake}$, respectively. The maximum deceleration $a_{max,brake}$, the maximum acceleration $a_{max,accel}$, the minimum deceleration $a_{min,brake}$, L, and ρ have the same contents as the contents described in the first embodiment, and are set values set in advance.

Expression 11 is a solution obtained by taking Expression 9 as an equation and solving for $v_m$. When solving Expression 9 for $v_m$, two real solutions are obtained. The two real solutions are a positive solution and a negative solution. Since $v_m$ is positive, the only positive solution of solving Expression 9 for velocity $v_m$ is one that actually indicates velocity $v_m$.

The maximum deceleration $a_{max,brake}$, the maximum acceleration $a_{max,accel}$, and the minimum deceleration $a_{min,brake}$ are set to the same values for all the vehicles equipped with the processing system 1. Therefore, Expression 11 can be considered as a relationship between the maximum deceleration $a_{max,brake}$, the maximum acceleration $a_{max,accel}$ as the preceding vehicle set in the host vehicle 2, the minimum deceleration $a_{min,brake}$ as the following vehicle, the vehicle length L of the host vehicle 2, the response time ρ, and the upper limit velocity $v_{limit}$ of the host vehicle 2.

When Expressions 10 and 11 are satisfied, Expression 9 is satisfied in the same manner when Expression 6 is satisfied. Therefore, even in the second embodiment, even when a vehicle with other vehicles in front of and behind the vehicle changes a lane in a situation in which three or more vehicles are traveling in a row, it is possible to reduce that the other vehicles are determined to violate a safety envelope.

Third Embodiment

A third embodiment is another modification of the first embodiment.

In the third embodiment, the safety distance $d_{min}$ is calculated using a preceding vehicle brake profile and a following vehicle brake profile. The preceding vehicle brake profile is information including a stop distance of a preceding vehicle (hereinafter, referred to as a preceding vehicle stop distance). The following vehicle brake profile is information including a stop distance of a following vehicle (hereinafter, referred to as a following vehicle stop distance). These two stop distances are distances from a point when the preceding vehicle starts a braking process as a reference until the vehicle stops. The preceding vehicle stop distance does not include a free traveling distance, and the preceding vehicle stop distance is the same as the preceding vehicle braking distance. On the other hand, the following vehicle stop distance is a sum of a following vehicle free traveling distance and a following vehicle braking distance. The brake profile is information including a temporal change of the acceleration a of the vehicle, in addition to the stop distance.

Figure 20:
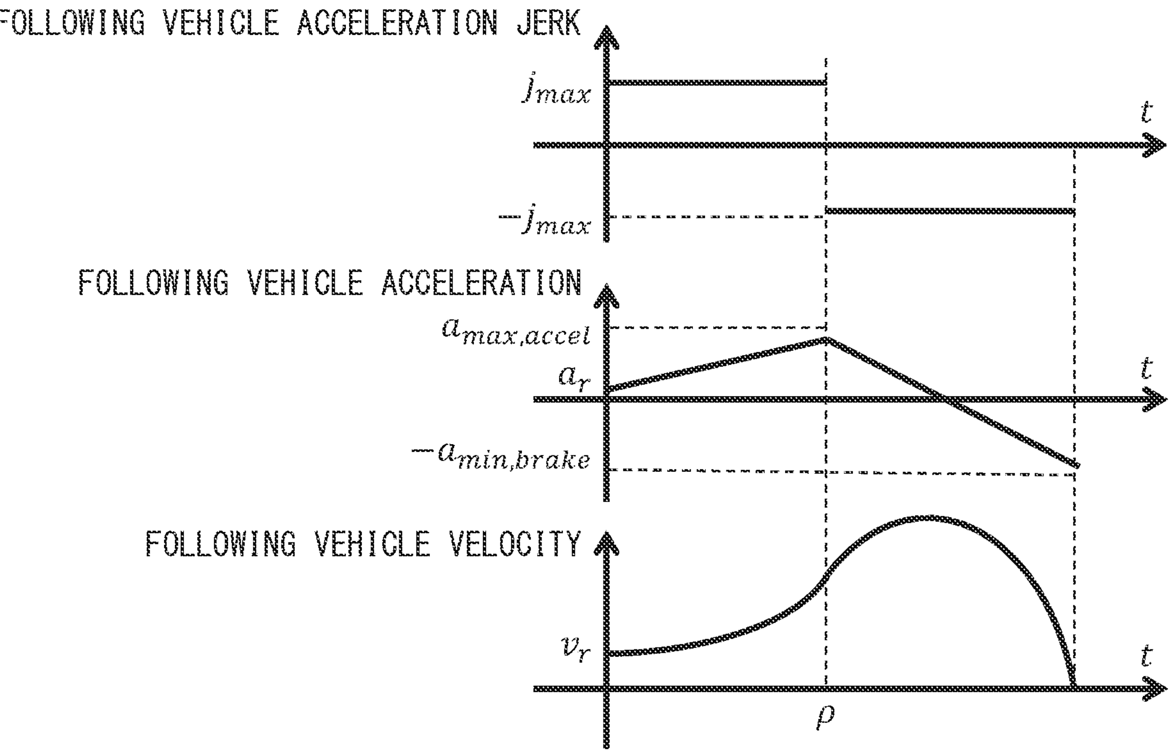
FIG. 20 is a diagram illustrating an example of a brake profile of the following vehicle.

The preceding vehicle acceleration and the preceding vehicle velocity illustrated in FIG. 11 used in the description of the first embodiment indicate a temporal change in acceleration a and velocity v in one preceding vehicle brake profile. The following vehicle acceleration and the following vehicle velocity illustrated in FIG. 11 indicate a temporal change in acceleration a and velocity v in one following vehicle brake profile. FIG. 20 illustrates a temporal change in jerk acceleration, acceleration a, and velocity v in another following vehicle brake profile different FIG. 11.

FIG. 21 illustrates a preceding vehicle stop distance, a following vehicle stop distance, and the safety distance $d_{min}$ between the vehicles $c_m$ and $c_r$, between the vehicles $c_f$ and $c_m$, and between the vehicles $c_f$ and $c_r$ for the three vehicles $c_f$, $c_m$, and $c_r$ illustrated in FIG. 15.

P is a stop distance without the response time ρ, and S is a stop distance with the response time ρ. As illustrated in FIG. 11, for the stop distance, since a time when the preceding vehicle starts the deceleration is defined as to, it is not necessary to consider the response time ρ until the start of braking for the preceding vehicle stop distance. On the other hand, as illustrated in FIG. 11, the following vehicle starts the braking after the response time ρ elapses. Therefore, it is necessary to consider the response time ρ for the following vehicle stop distance. In other words, the stop distance without the response time ρ means the preceding vehicle stop distance, and the stop distance with the response time ρ means the following vehicle stop distance.

When using these stop distance symbols P and S, each safety distance $d_{min}$ can be represented at a bottom of a table illustrated in FIG. 21. Expression 12 is obtained by substituting each safety distance $d_{min}$ illustrated in FIG. 21 into Expression 7.

$$P_m - S_m - L \leq 0 \quad \text{(Expression 12)}$$

The host vehicle 2 sets the stop distance with the response time ρ and the stop distance without the response time ρ of the subject vehicle to satisfy Expression (12). Accordingly, when the host vehicle 2 is the vehicle $c_m$, it is possible to reduce that the vehicle $c_f$ and the vehicle $c_r$ are determined to violate a safety envelope even when the host vehicle 2 changes a lane.

The stop distance without the response time ρ (that is, the preceding vehicle stop distance) and the stop distance with the response time ρ (that is, the following vehicle stop distance) are preferably set to satisfy Expression 12, for another vehicle other than the host vehicle 2, such as the vehicle $c_f$ or the vehicle $c_r$. In Expression 12, L is smaller than $P_m$ and $S_m$. Therefore, the preceding vehicle stop distance and the following vehicle stop distance may be set to satisfy Expression 13 in which L is not considered.

$$P_m \leq S_m \quad \text{(Expression 13)}$$

Expression 13 is an expression in which L, which has a small effect, is omitted from Expression 12. When Expression 13 is satisfied, Expression 12 is always satisfied. Therefore, satisfying Expression 13 may be considered to be substantially the same as satisfying Expression 12.

In Expression 12 and Expression 13, the parameters $P_m$ and $S_m$ are the stop distances for the same vehicle. Therefore, these $P_m$ and $S_m$ can be different values for each vehicle.

As described above, the brake profile includes a temporal change of the acceleration a. In order to set the stop distance included in the brake profile to satisfy Expression 12 or Expression 13, how to change the acceleration a over time is also set. Since the acceleration a is used in setting the safety distance $d_{min}$ in S102, the setting of the temporal change of the acceleration a is reflected in the setting of the safety distance $d_{min}$ in S102. The processing method executed by the risk monitoring block 140 in the processing system 1 of the third embodiment has the same manner as the first embodiment, except that the parameters for setting the safety distance $d_{min}$ are different.

Figure 22:
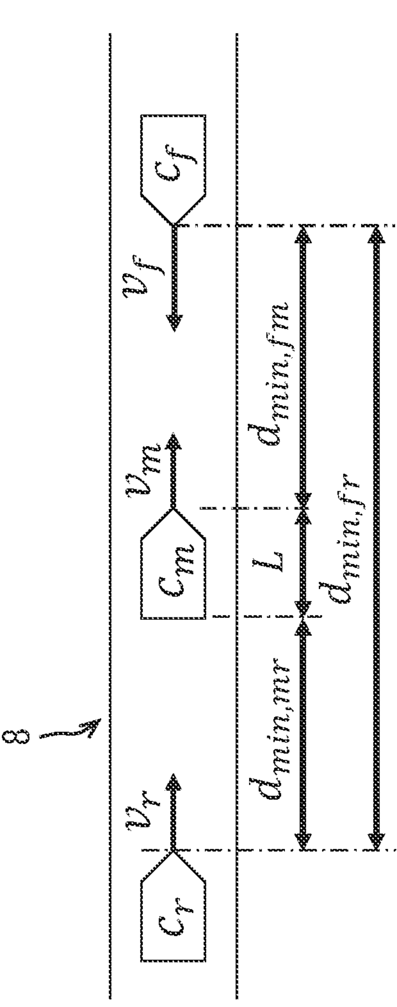
FIG. 22 is a diagram of one vehicle traveling in an opposite direction to two vehicles.

FIG. 22 illustrates a diagram in which the vehicle $c_f$ is traveling in one direction along a road, and the vehicle $c_m$ and the vehicle $c_r$ are traveling in an opposite direction to the vehicle $c_f$. Even in a situation illustrated in FIG. 22, when Expression 7 is satisfied, it is not necessary to calculate the safety distance $d_{min,fr}$ and perform a safety determination by using the safety distance $d_{min,fr}$.

FIG. 23 is a diagram illustrating each safety distance $d_{min}$ as a stop distance in the situation illustrated in FIG. 22. By substituting each safety distance $d_{min}$ illustrated in FIG. 23 into Expression 7, Expression 12 is obtained in the same manner when the three vehicles are traveling in the same direction. Therefore, by setting the preceding vehicle stop distance and the following vehicle stop distance to satisfy Expression 12, it is possible to reduce that the vehicle $c_r$ is determined to violate a safety envelope even when the vehicle $c_m$ changes a lane in the situation illustrated in FIG. 22.

That is, when Expression 12 or Expression 13 is satisfied, in both the situation illustrated in FIG. 15 and the situation illustrated in FIG. 22, it is possible to reduce that the vehicle $c_r$ is determined to violate a safety envelope even when the vehicle $c_m$ changes a lane.

Figure 24:
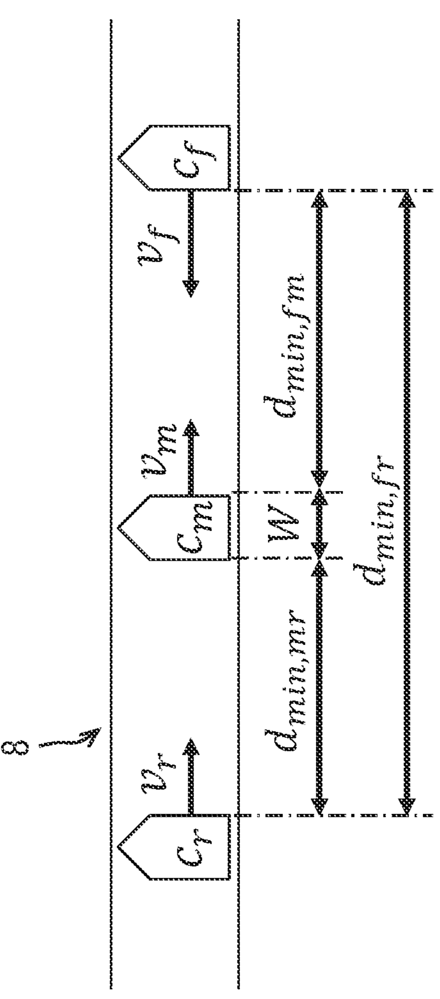
FIG. 24 is a diagram in which each vehicle is also moving in a lateral direction.

FIG. 24 conceptually illustrates a state in which the vehicles $c_f$, $c_m$, and $c_r$ are also moving in the lateral direction. Arrows extending from the vehicles $c_f$, $c_m$, and $c_r$ indicate whether a moving direction of each of the vehicles $c_f$, $c_m$, and $c_r$ in the lateral direction is left or right. Of course, each of the vehicles $c_f$, $c_m$, and $c_r$ is also moving in the longitudinal direction.

When the safety distance $d_{min}$ in the lateral direction satisfies Expression 14 below, the vehicle $c_f$ or the vehicle $c_r$ is determined to violate a safety envelope even when the vehicle $c_m$ moves back and forth relative to the vehicles $c_f$ and $c_r$. In Expression 14, W is a length of the vehicle $c_m$ in the width direction.

$$d_{min,mr}+d_{min,fm}+W \geq d_{min,fr} \quad \text{(Expression 14)}$$

A stop distance of each of the vehicles $c_f$, $c_m$, and $c_r$ in the lateral direction is defined as Q. The stop distance in the lateral direction is a distance from when the deceleration process in the lateral direction is started as a reference until the vehicle stops. A brake profile in the lateral direction is information including a stop distance in the lateral direction and a temporal change in acceleration a of the vehicle in the lateral direction.

The safety distance $d_{min}$ between two vehicles positioned to the left and right of each other can be represented by a difference in each stop distance between the left vehicle and the right vehicle. In a positional relationship illustrated in FIG. 24, each of the safety distances $d_{min}$ between the vehicles $c_m$ and $c_r$, between the vehicles $c_f$ and $c_m$, and between the vehicles $c_f$ and $c_r$ is represented by a relationship illustrated in a bottom row of FIG. 25, by using the stop distance Q.

Expression 15 is obtained by substituting each safety distance $d_{min}$ illustrated in FIG. 25 into Expression 14.

$$W \geq 0 \quad \text{(Expression 15)}$$

Expression 15 is always established. Therefore, regarding a vehicle movement in the lateral direction, it is only necessary to compare a distance to the adjacent vehicle with the safety distance $d_{min}$, and it is not necessary to set a limit on the acceleration a or the velocity v.

Fourth Embodiment

A fourth embodiment is a modification of the first, second, and third embodiments.

In the fourth embodiment, the safety distance $d_{min}$ in a situation of determining a rear-end collision is determined from Expression 16 illustrated in FIG. 26, instead of Expression 4. Expression 16 is an expression obtained by comparing a first distance $d_1$ and a second distance $d_2$ and defining the longer distance as the safety distance $d_{min}$. A right side of Expression 16 represents the first distance $d_1$ and the second distance $d_2$ as stop distances.

The first distance $d_1$ can be represented as $S_r - P_m$ by using the stop distances P and S of the third embodiment. That is, the first distance $d_1$ is the safety distance $d_{min,mr}$ between the vehicles $c_m$ and $c_r$, assuming that the vehicle $c_r$ illustrated in FIG. 15 is a subject vehicle. When the subject vehicle is defined as the host vehicle 2, the safety distances $d_{min,mr}$, that is, the first distance $d_1$ is a distance obtained by subtracting the stop distance $P_m$ as a preceding vehicle of $c_m$, which is the preceding vehicle, from the stop distance $S_r$ as a following vehicle of the host vehicle 2, which is the following vehicle. The safety distance $d_{min,mr}$ is also illustrated in FIG. 16. The safety distances $d_{min,mr}$ illustrated in FIG. 16 can be calculated from Expression 4.

The second distance $d_2$ can be represented as $(S_r - P_f) - (S_m - P_f) - L$ by using the stop distances P and S of the third embodiment. $S_r - P_f$ is the safety distance $d_{min,fr}$ between the vehicles $c_f$ and $c_r$, as illustrated in FIG. 21. $S_m - P_f$ is the safety distance $d_{min,fm}$ between the vehicles $c_f$ and $c_m$, as illustrated in FIG. 21. With the first distance $d_1$, the safety distance $d_{min,mr}$ is directly calculated. On the other hand, with the second distance $d_2$, the safety distance $d_{min,mr}$ is calculated from other than the safety distance $d_{min,mr}$, by using a relationship between the safety distance $d_{min,mr}$, the vehicle length L, the safety distance $d_{min,fm}$, and the safety distance $d_{min,fr}$ illustrated in FIG. 15.

When calculating $(S_r - P_f) - (S_m - P_f) - L$ illustrated in a first line of Expression 16, $S_r - S_m - L$ is obtained. Therefore, the second distance $d_2$ is a distance obtained by subtracting the stop distance $S_m$ as a following vehicle of the vehicle $c_m$, which is a preceding vehicle, and the vehicle length L of the vehicle $c_m$, which is the preceding vehicle, from the stop distance $S_r$ as a following vehicle of the host vehicle 2.

Expressions 17 and 18 illustrated in FIG. 27A and FIG. 27B are expressions obtained by further transforming the first distance $d_1$ and the second distance $d_2$ by using the maximum accelerations $a_{max,accel}$ and the like. Expression 17 is obtained by substituting Expression 1, Expression 2, and Expression 3 into Expression 4. As can be seen from Expressions 17 and 18, the first distance $d_1$ and the second distance $d_2$ include the velocity v. Since the velocity v is a value detected by using a sensor, the velocity v includes a detection error. Therefore, the first distance $d_1$ and the second distance $d_2$ do not completely coincide with each other. Therefore, in the fourth embodiment, Expression 16 is used to calculate the safety distance $d_{min}$ in a situation in which a rear-end collision is determined.

By making a safety determination using the safety distance $d_{min}$ calculated in this manner, a result of the safety determination becomes more useful.

Fifth Embodiment

A fifth embodiment is a modification of the fourth embodiment.

In the fifth embodiment, Expression 19 illustrated in FIG. 28A to FIG. 28O is used instead of Expression 16, and a value obtained by Expression 19 is defined as the safety distance $d_{min}$ in a situation of determining a rear-end collision. A first term of Expression 19 can be calculated by Expression 20, and is an average value, that is, an expectation value, of the safety distance $d_{min}$, which fluctuates due to a detection error of a sensor. A second term of Expression 19 is three times a standard deviation $\sigma$ of the safety distance $d_{min}$, which fluctuates due to the detection error of the sensor. In Expression 19, a variance V is used instead of the standard deviation $\sigma$. The second term of Expression 19 is an addition value to be added to the expectation value. This addition value may have the standard deviation $\sigma$ as a reference, and may be a value other than three times the standard deviation $\sigma$. For example, the addition value may be an integral multiple such as 1, 2, or 6 times the standard deviation $\sigma$, or may be a decimal multiple.

The first term of Expression 19 can be represented by Expression 20, and the second term of Expression 19 can be represented by Expression 21. $\theta$ and $\alpha$ in Expressions 20 and 21 can be represented by Expression 22.

$E[d_1]$, $E[d_2]$, and $V[d_2]$ illustrated in Expressions 20 and 21 can be represented by Expression 23, Expression 24, Expression 25, and Expression 26, respectively.

Assuming that the velocity v is a random variable and that a probability distribution of the velocity v follows a normal distribution, Expression 27 holds. When using Expression 27, $E[S_r]$, $E[S_m]$, and $E[P_m]$ in Expression 23 and Expression 25 can be represented by Expression 28, Expression 29, and Expression 30. $V[S_r]$, $V[S_m]$, and $V[P_m]$ in Expression 24 and Expression 26 can be represented by Expression 31, Expression 32, and Expression 33.

By making a safety determination using the safety distance $d_{min}$ obtained by Expression 19, a result of the safety determination takes into consideration a detection error of the velocity v.

Sixth Embodiment

A sixth embodiment is still another modification of the first embodiment.

Figure 29:
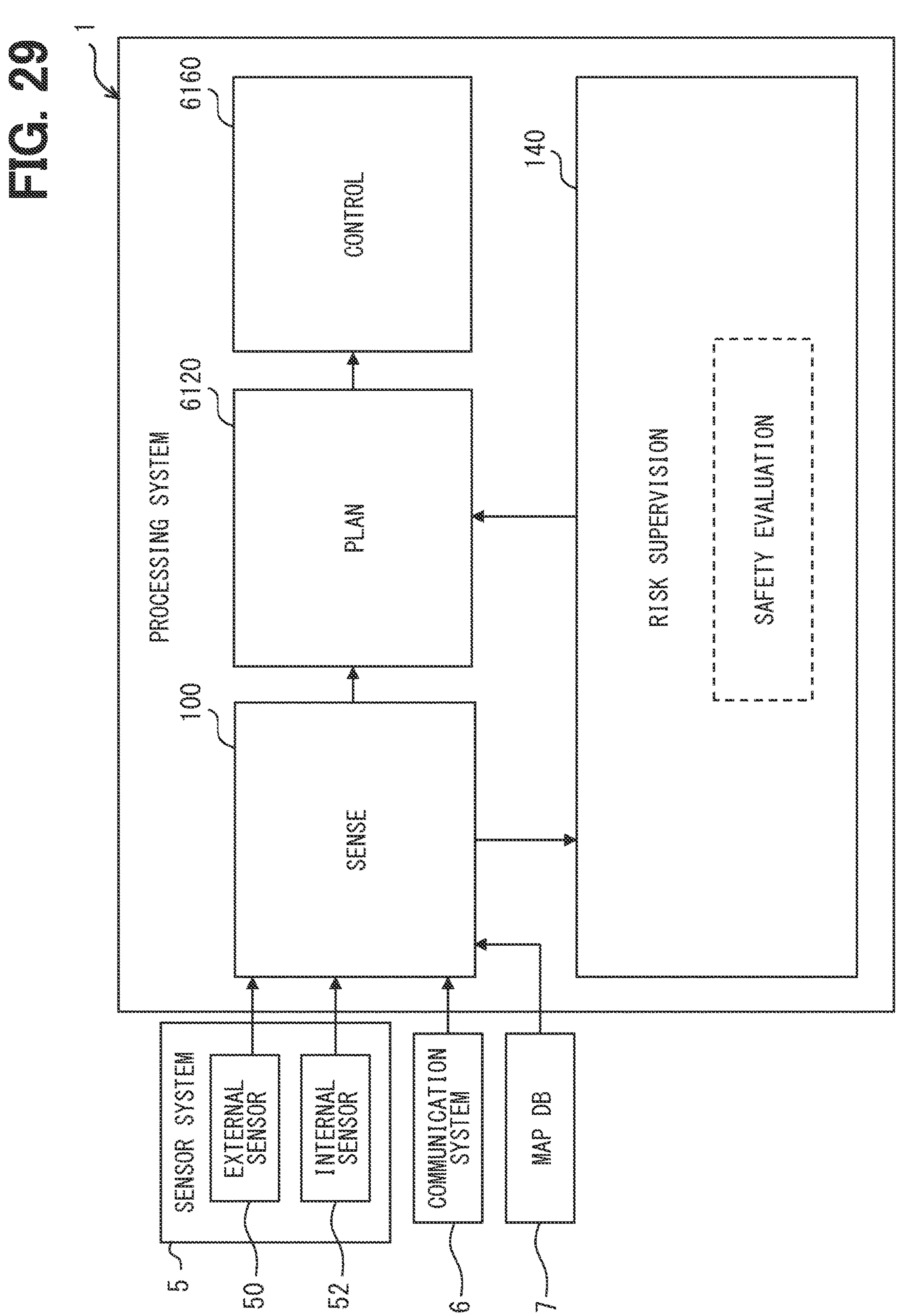
FIG. 29 is a block diagram illustrating a processing system of a sixth embodiment.

As illustrated in FIG. 29, in a control block 6160 of the sixth embodiment, acquisition processing of determination information regarding a safety envelope from the risk monitoring block 140 is omitted. Therefore, a planning block 6120 of the sixth embodiment acquires determination information regarding the safety envelope from the risk monitoring block 140. The planning block 6120 plans driving control of the host vehicle 2 in accordance with the planning block 120 when the determination information indicating that the safety envelope is not violated is acquired. On the other hand, when the determination information indicating that the safety envelope is violated is acquired, the planning block 6120 imposes a constraint or restriction on the driving control based on the determination information, in a stage of planning the driving control in accordance with the planning block 120. That is, the planning block 6120 limits the driving control to be planned. In either case, the control block 6160 executes the driving control of the host vehicle 2, planned by the planning block 6120.

Seventh Embodiment

A seventh embodiment is still another modification of the first embodiment.

As illustrated in FIG. 30, in a control block 7160 of the seventh embodiment, acquisition processing of determination information regarding a safety envelope from the risk monitoring block 7140 is omitted. Therefore, a risk monitoring block 7140 of the seventh embodiment acquires information representing a result of driving control executed by the control block 7160 on the host vehicle 2. The risk monitoring block 7140 evaluates the driving control, by executing a safety determination based on the safety envelope related to the result of the driving control.

Eighth Embodiment

An eighth embodiment is a modification of the first and seventh embodiments.

Figure 31:
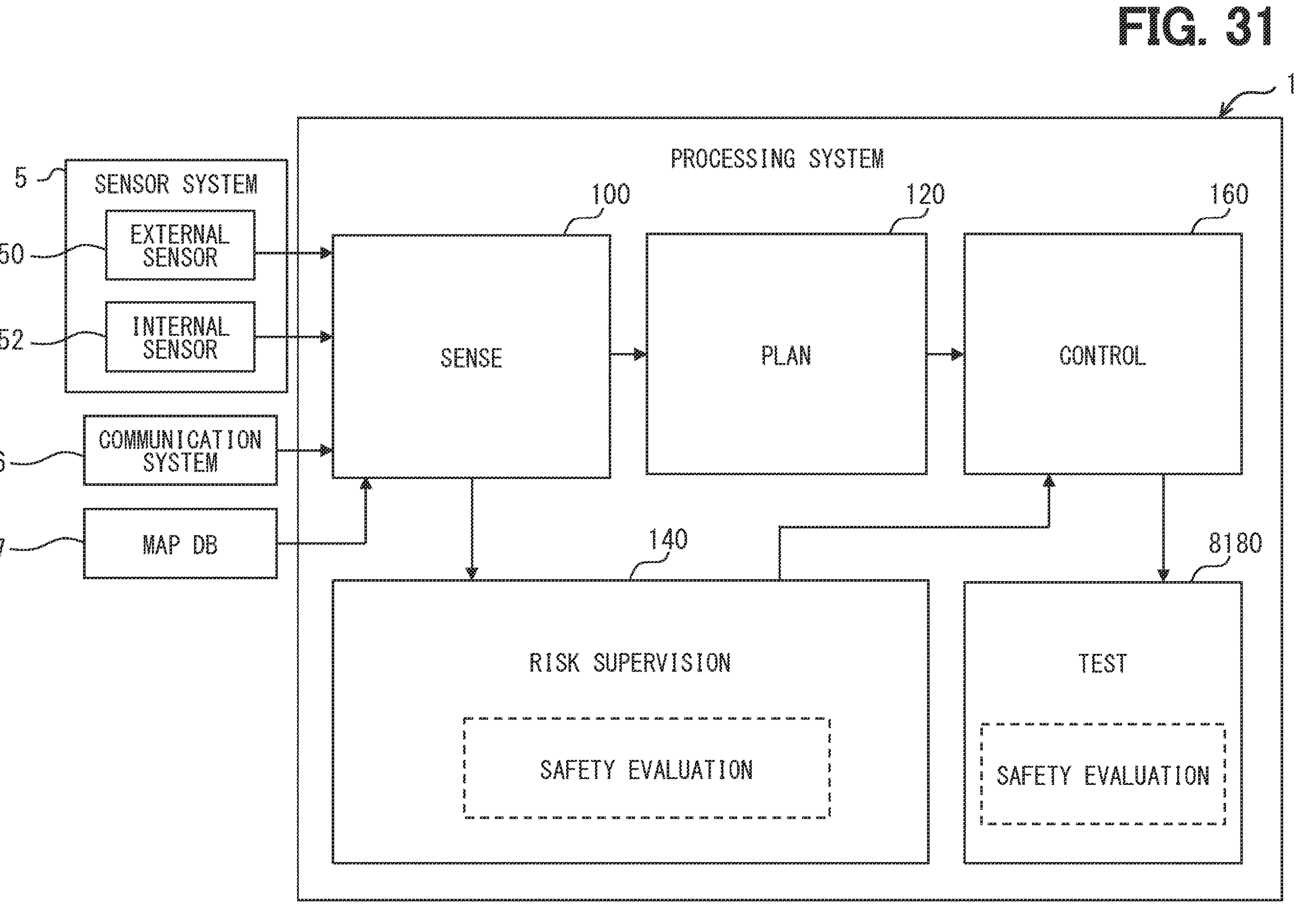
FIG. 31 is a block diagram illustrating a processing system of an eighth embodiment.
Figure 32:
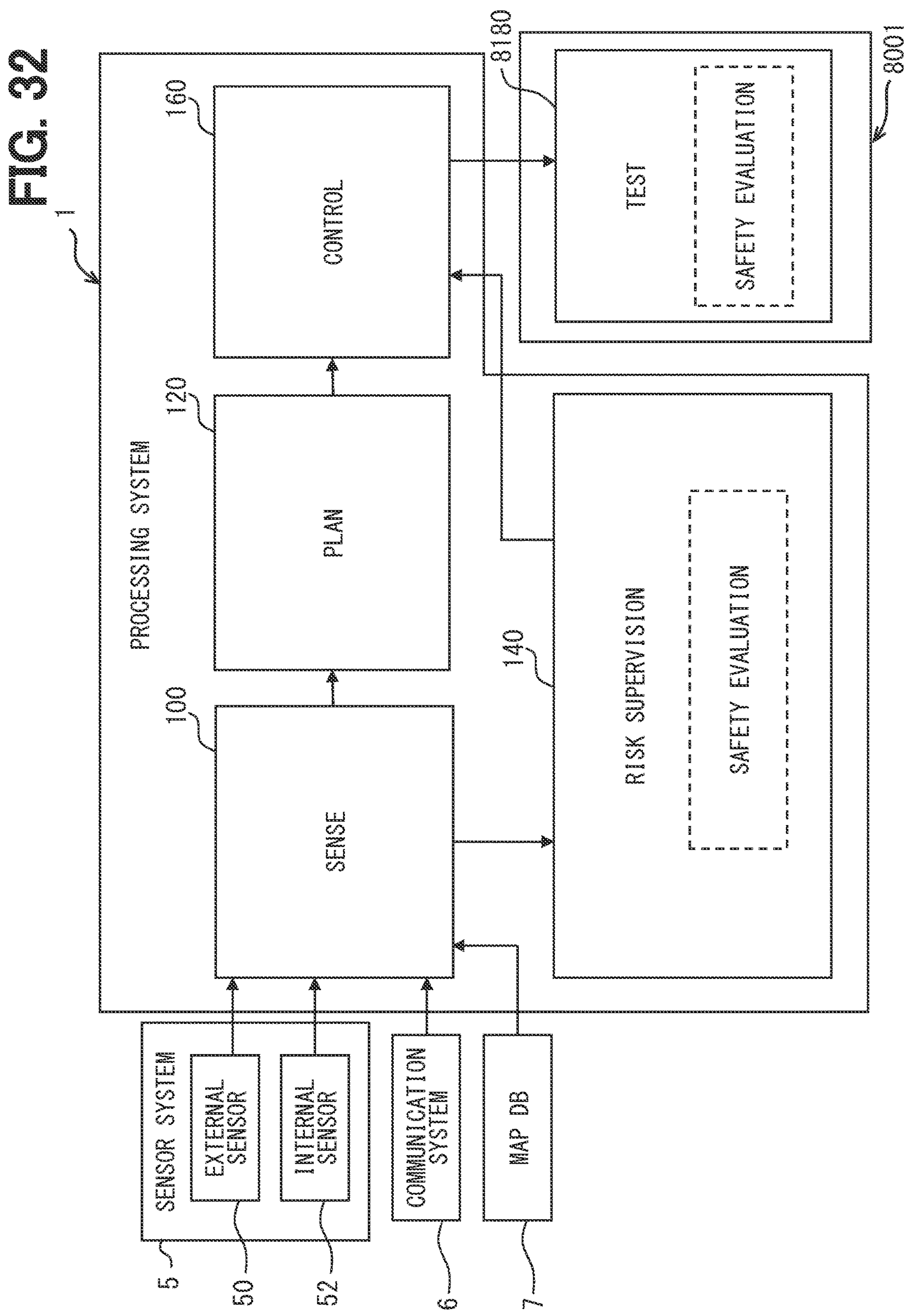
FIG. 32 is a block diagram illustrating the processing system of the eighth embodiment.

As illustrated in FIGS. 31 and 32, in the eighth embodiment, which is a modification of the first embodiment from the viewpoint of the processing system 1, for example, a test block 8180 which tests driving control by the processing system 1 to approve a safety and the like is added. The test block 8180 is provided with functions in accordance with the sensing block 100 and the risk monitoring block 140. In FIGS. 31 and 32, an acquisition path of data for monitoring and determining a failure of detection information is not illustrated.

The test block 8180 may be constructed by the processing system 1 illustrated in FIG. 31 executing a test program that is added to a processing program for constructing each of the blocks 100, 120, 140, and 160. The test block 8180 may be constructed by a processing system 8001, which performs a test, different from the processing system 1 as illustrated in FIG. 32 executing a test processing program different from the processing program for constructing each of the blocks 100, 120, 140, and 160. The processing system 8001, which performs a test, may be configured by at least one dedicated computer having the memory 10 and the processor 12, which is connected to the processing system 1 for testing driving control (the case of connection through the communication system 6 is not illustrated).

A safety determination by test block 8180 may be executed each time one control cycle of information representing the result of driving control is stored in the memory 10 of the processing system 1 or the other processing system 8001. The safety determination by the test block 8180 may be executed each time multiple control cycles are stored in the memory 10.

OTHER EMBODIMENTS

Although multiple embodiments have been described above, the present disclosure is not construed as being limited to these embodiments, and can be applied to various embodiments and combinations within a scope that does not depart from the gist of the present disclosure.

In the modification, the safety distance in the situation of determining a side-surface collision, that is, the safety distance in the lateral direction may be a sum of a braking distance of the host vehicle 2 in the lateral direction and a braking distance of the target moving object 3 in the lateral direction. The braking distance of the host vehicle 2 in the lateral direction may be determined based on a current velocity in the lateral direction, a maximum yaw rate, and a maximum change in rotation radius of the host vehicle 2. The lateral braking distance of the target moving object 3 may be determined based on a current velocity in the lateral direction, a maximum yaw rate, and a maximum change in rotation radius of the target vehicle 3*a*. The maximum yaw rate may be a value set from the viewpoint of continuing safe traveling. The maximum yaw rate may be a maximum reasonably foreseeable expected yaw rate that the target moving object 3 (other road users) could exhibit. The maximum change in rotation radius may be a value set from the viewpoint of continuing safe traveling. The maximum change in rotation radius may be a maximum reasonably foreseeable expected change in rotation radius that the target moving object 3 (other road users) could exhibit. At least one of the maximum yaw rate and the maximum change in rotation radius may be determined based on a road surface state (for example, road slope and material), a climate condition (for example, snow and humidity), a vehicle state (for example, tire pressure, brake pad state), and the like.

In the modification, the dedicated computer forming the processing system 1 may include at least one of a digital circuit and an analog circuit as a processor. The digital circuit is at least one type of, for example, an application specific integrated circuit (ASIC), a field programmable gate array (FPGA), a system on a chip (SOC), a programmable gate array (PGA), a complex programmable logic device (CPLD), and the like. Such a digital circuit may also have a memory in which a program is stored.

What is claimed is:

1. A processing method executed by a processor for performing processing related to autonomous driving control of a host vehicle, the processing method comprising:

acquiring detection information indicating a state detected in a traveling environment of the host vehicle;

setting a safety envelope, wherein the setting of the safety envelope includes defining a boundary, a margin, or a buffer area around the host vehicle; and monitoring a violation of the safety envelope based on a comparison of the safety envelope and a positional relationship between the host vehicle and a target vehicle, wherein when the target vehicle is a front vehicle and the host vehicle is a rear vehicle, the safety envelope is calculated based on a velocity and a maximum deceleration of the front vehicle, and a velocity, a maximum acceleration, and a minimum deceleration of the rear vehicle, and the processing method further includes setting the minimum deceleration of the rear vehicle to be equal to or less than the maximum deceleration of the front vehicle, and autonomously controlling deceleration of the rear vehicle such that the violation of the safety envelope is reduced in the rear vehicle.

2. The processing method according to claim 1, wherein the setting of the safety envelope includes setting a safety distance or specifying the boundary, the margin, or the buffer area based on the safety distance, when the target vehicle is the front vehicle and the host vehicle is the rear vehicle, the safety distance is calculated based on the velocity and the maximum deceleration of the front vehicle, and the velocity, the maximum acceleration, and the minimum deceleration of the rear vehicle, and the minimum deceleration of the rear vehicle is set to be equal to or less than the maximum deceleration of the front vehicle.

3. The processing method according to claim 2, wherein a first distance is obtained by subtracting a stop distance of the front vehicle when traveling in front of the host vehicle from a stop distance of the host vehicle when traveling behind the front vehicle as the rear vehicle, a second distance is obtained by subtracting a stop distance of the front vehicle when traveling behind another vehicle and a vehicle length of the front vehicle from the stop distance of the host vehicle when traveling behind the front vehicle, and the safety distance used in the monitoring is set based on a longer distance between the first distance and the second distance.

4. The processing method according to claim 3, wherein the safety distance used in the monitoring is set as a value obtained by adding an addition value determined based on a standard deviation of the longer distance between the first distance and the second distance to an expectation value of the longer distance between the first distance and the second distance.

5. The processing method according to claim 4, wherein the addition value is three times the standard deviation.

6. A processing method executed by a processor for performing processing related to autonomous driving control of a host vehicle, the processing method comprising:

acquiring detection information indicating a state detected in a traveling environment of the host vehicle;

setting a safety envelope, wherein the setting of the safety envelope includes defining a boundary, a margin, or a buffer area around the host vehicle; and monitoring a violation of the safety envelope based on a comparison of the safety envelope and a positional relationship between the host vehicle and a target vehicle and a comparison of a velocity of the host vehicle and one or more limit values set with respect to the velocity of the host vehicle, wherein when the target vehicle is a front vehicle and the host vehicle is a rear vehicle, the safety envelope is calculated based on a velocity and a maximum deceleration of the front vehicle, and a velocity, a maximum acceleration, and a minimum deceleration of the rear vehicle, and the processing method further includes autonomously controlling the minimum deceleration of the rear vehicle to be larger than the maximum deceleration of the front vehicle such that the violation of the safety envelope is reduced in the rear vehicle, the one or more limit values set with respect to the velocity of the host vehicle includes an upper limit velocity calculated by mathematical formula 1 as follows:

(Mathematical formula 1)

$$v_{limit} = \frac{b_f(a_r+b_r)\rho + \sqrt{b_r b_f\{2L(b_r-b_f)+(a_r+b_f)(a_r+b_r)\rho^2\}}}{(b_r-b_f)}$$

where $v_{limit}$ is the upper limit velocity, $b_f$ is the maximum deceleration of the front vehicle, $a_r$ is the maximum acceleration of the rear vehicle, $b_r$ is the minimum deceleration of the rear vehicle, ρ is a response time, and L is a vehicle length of the host vehicle.

7. The processing method according to claim 6, wherein the setting of the safety envelope includes setting a safety distance or specifying the boundary, the margin, or the buffer area based on the safety distance, and when the target vehicle is the front vehicle and the host vehicle is the rear vehicle, the safety distance is calculated based on the velocity and the maximum deceleration of the front vehicle, and the velocity, the maximum acceleration, and the minimum deceleration of the rear vehicle.

8. A processing method executed by a processor for performing processing related to autonomous driving control of a host vehicle, the processing method comprising:

acquiring detection information indicating a state detected in a traveling environment of the host vehicle;

setting a safety envelope, wherein the setting of the safety envelope includes defining a boundary, a margin, or a buffer area around the host vehicle; and monitoring a violation of the safety envelope based on a comparison of the safety envelope and a positional relationship between the host vehicle and a target vehicle, wherein when the host vehicle is a rear vehicle, a stop distance is defined as S, when the host vehicle is a front vehicle, a stop distance is defined as P, a total length of the host vehicle is defined as L, and the processing method further includes autonomously controlling the boundary, the margin, or the buffer area is defined to satisfy P–S–L≤0 such that the violation of the safety envelope is reduced in the rear vehicle.

9. The processing method according to claim 8, wherein the setting of the safety envelope includes setting a safety distance or specifying the boundary, the margin, or the buffer area based on the safety distance, and the safety distance is set to satisfy P–S–L≤0.

10. A processing system that performs processing related to autonomous driving control of a host vehicle, the processing system comprising:

a processor configured to:

acquire detection information indicating a state detected in a traveling environment of the host vehicle;

set a safety envelope, wherein the setting of the safety envelope includes defining a boundary, a margin, or a buffer area around the host vehicle; and monitor a violation of the safety envelope based on a comparison of the safety envelope and a positional relationship between the host vehicle and a target vehicle, wherein when the target vehicle is a front vehicle and the host vehicle is a rear vehicle, the safety envelope is calculated based on a velocity and a maximum deceleration of the front vehicle, and a velocity, a maximum acceleration, and a minimum deceleration of the rear vehicle, and the processing system further includes setting the minimum deceleration of the rear vehicle to be equal to or less than the maximum deceleration of the front vehicle, and autonomously controlling deceleration of the rear vehicle such that the violation of the safety envelope is reduced in the rear vehicle.

11. A processing system that performs processing related to autonomous driving control of a host vehicle, the processing system comprising:

a processor configured to:

acquire detection information indicating a state detected in a traveling environment of the host vehicle;

set a safety envelope, wherein the setting of the safety envelope includes defining a boundary, a margin, or a buffer area around the host vehicle; and monitor a violation of the safety envelope based on a comparison of the safety envelope and a positional relationship between the host vehicle and a target vehicle and a comparison of a velocity of the host vehicle and one or more limit values set with respect to the velocity of the host vehicle, wherein when the target vehicle is a front vehicle and the host vehicle is a rear vehicle, the safety envelope is calculated based on a velocity and a maximum deceleration of the front vehicle, and a velocity, a maximum acceleration, and a minimum deceleration of the rear vehicle, and the processing system further includes autonomously controlling the minimum deceleration of the rear vehicle to be larger than the maximum deceleration of the front vehicle such that the violation of the safety envelope is reduced in the rear vehicle, the one or more limit values set with respect to the velocity of the host vehicle includes an upper limit velocity calculated by mathematical formula 1 as follows:

(Mathematical formula 1)

$$v_{limit} = \frac{b_f(a_r + b_r)\rho + \sqrt{b_r b_f\{2L(b_r - b_f) + (a_r + b_f)(a_r + b_r)\rho^2\}}}{(b_r - b_f)}$$

where $v_{limit}$ is the upper limit velocity, $b_f$ is the maximum deceleration of the front vehicle, $a_r$ is the maximum acceleration of the rear vehicle, $b_r$ is the minimum deceleration of the rear vehicle, ρ is a response time, and L is a vehicle length of the host vehicle.

12. A processing system that performs processing related to autonomous driving control of a host vehicle, the processing system comprising:

a processor configured to:

acquire detection information indicating a state detected in a traveling environment of the host vehicle;

set a safety envelope, wherein the setting of the safety envelope includes defining a boundary, a margin, or a buffer area around the host vehicle; and monitor a violation of the safety envelope based on a comparison of the safety envelope and a positional relationship between the host vehicle and a target vehicle, wherein when the host vehicle is a rear vehicle, a stop distance is defined as S, when the host vehicle is a front vehicle, a stop distance is defined as P, a total length of the host vehicle is defined as L, and the processing system further includes autonomously controlling the boundary, the margin, or the buffer area is defined to satisfy P–S–L≤0 such that the violation of the safety envelope is reduced in the rear vehicle.

13. A computer-readable non-transitory storage medium storing a processing program for performing processing related to autonomous driving control of a host vehicle, the processing program comprising instruction to be executed by a processor, the instructions comprising:

acquiring detection information indicating a state detected in a traveling environment of the host vehicle;

setting a safety envelope, wherein the setting of the safety envelope includes defining a boundary, a margin, or a buffer area around the host vehicle; and monitoring a violation of the safety envelope based on a comparison of the safety envelope and a positional relationship between the host vehicle and a target vehicle, wherein when the target vehicle is a front vehicle and the host vehicle is a rear vehicle, the safety envelope is calculated based on a velocity and a maximum deceleration of the front vehicle, and a velocity, a maximum acceleration, and a minimum deceleration of the rear vehicle, and the instructions further comprise setting the minimum deceleration of the rear vehicle is set to be equal to or less than the maximum deceleration of the front vehicle, and autonomously controlling deceleration of the rear vehicle such that the violation of the safety envelope is reduced in the rear vehicle.

14. A computer-readable non-transitory storage medium storing a processing program for performing processing related to autonomous driving control of a host vehicle, the processing program comprising instructions to be executed by a processor, the instructions comprising:

acquiring detection information indicating a state detected in a traveling environment of the host vehicle;

setting a safety envelope, wherein the setting of the safety envelope includes defining a boundary, a margin, or a buffer area around the host vehicle; and monitoring a violation of the safety envelope based on a comparison of the safety envelope and a positional relationship between the host vehicle and a target vehicle and a comparison of a velocity of the host vehicle and one or more limit values set with respect to the velocity of the host vehicle, wherein when the target vehicle is a front vehicle and the host vehicle is a rear vehicle, the safety envelope is calculated based on a velocity and a maximum deceleration of the front vehicle, and a velocity, a maximum acceleration, and a minimum deceleration of the rear vehicle, and the instructions further comprise autonomously controlling the minimum deceleration of the rear vehicle to be larger than the maximum deceleration of the front vehicle such that the violation of the safety envelope is reduced in the rear vehicle, the one or more limit values set with respect to the velocity of the host vehicle includes an upper limit velocity calculated by mathematical formula 1 as follows:

(Mathematical formula 1)

$$v_{limit} = \frac{b_f(a_r + b_r)\rho + \sqrt{b_r b_f\{2L(b_r - b_f) + (a_r + b_f)(a_r + b_r)\rho^2\}}}{(b_r - b_f)}$$

where $v_{limit}$ is the upper limit velocity, $b_f$ is the maximum deceleration of the front vehicle, $a_r$ is the maximum acceleration of the rear vehicle, $b_r$ is the minimum deceleration of the rear vehicle, ρ is a response time, and L is a vehicle length of the host vehicle.

15. A computer-readable non-transitory storage medium storing a processing program for performing processing related to autonomous driving control of a host vehicle, the processing program comprising instructions to be executed by a processor, the instructions comprising:

acquiring detection information indicating a state detected in a traveling environment of the host vehicle;

setting a safety envelope, wherein the setting of the safety envelope includes defining a boundary, a margin, or a buffer area around the host vehicle; and monitoring a violation of the safety envelope based on a comparison of the safety envelope and a positional relationship between the host vehicle and a target vehicle, wherein when the host vehicle is a rear vehicle, a stop distance is defined as S, when the host vehicle is a front vehicle, a stop distance is defined as P, a total length of the host vehicle is defined as L, and the instructions further comprise autonomously controlling the boundary, the margin, or the buffer area is defined to satisfy P–S–L≤0 such that the violation of the safety envelope is reduced in the rear vehicle.

* * * * *